US011095556B2

(12) United States Patent
Das Sharma et al.

(10) Patent No.: US 11,095,556 B2
(45) Date of Patent: Aug. 17, 2021

(54) TECHNIQUES TO SUPPORT MULTIPLE PROTOCOLS BETWEEN COMPUTER SYSTEM INTERCONNECTS

(71) Applicant: INTEL CORPORATION, Santa Clara, CA (US)

(72) Inventors: Debendra Das Sharma, Saratoga, CA (US); Michelle C. Jen, Mountain View, CA (US); Mark S. Myers, Portland, OR (US); Don Soltis, Windsor, CO (US); Ramacharan Sundararaman, Hillsboro, OR (US); Stephen R. Van Doren, Portland, OR (US); Mahesh Wagh, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 890 days.

(21) Appl. No.: 15/639,393

(22) Filed: Jun. 30, 2017

(65) Prior Publication Data
US 2019/0007310 A1 Jan. 3, 2019

(51) Int. Cl.
*H04L 12/781* (2013.01)
*H04L 29/06* (2006.01)
(Continued)

(52) U.S. Cl.
CPC .............. *H04L 45/52* (2013.01); *H04L 49/60* (2013.01); *H04L 69/18* (2013.01); *H04L 69/323* (2013.01)

(58) Field of Classification Search
CPC ......... H04L 45/52; H04L 69/18; H04L 49/60; H04L 69/323
See application file for complete search history.

(56) References Cited

U.S. PATENT DOCUMENTS 8,467,218 B1 * 6/2013 Atsatt ................... G06F 13/405
365/63
2004/0202148 A1 * 10/2004 Kuehnel ................. H04L 45/50
370/352
(Continued)

OTHER PUBLICATIONS

International Search Report and Written Opinion, dated Sep. 28, 2018, Application No. PCT/US2018/035034, Filed Date: May 30, 2018, pp. 11.

*Primary Examiner* — Benjamin H Elliott, IV
(74) *Attorney, Agent, or Firm* — Kacvinsky Daisak Bluni PLLC

(57) ABSTRACT

Embodiments may be generally direct to apparatuses, systems, method, and techniques to provide multi-interconnect protocol communication. In an embodiment, an apparatus for providing multi-interconnect protocol communication may include a component comprising at least one connector operative to connect the component to at least one off-package device via a standard interconnect protocol, and logic, at least a portion of the logic comprised in hardware, the logic to determine data to be communicated via a multi-interconnect protocol, provide the data to a multi-protocol multiplexer to determine a route for the data, route the data on-package responsive to the multi-protocol multiplexer indicating a multi-interconnect on-package mode, and route the data off-package via the at least one connector responsive to the multi-protocol multiplexer indicating a multi-interconnect off-package mode. Other embodiments are described.

25 Claims, 11 Drawing Sheets

(51) Int. Cl.
*H04L 12/931* (2013.01)
*H04L 29/08* (2006.01)

(56) References Cited

U.S. PATENT DOCUMENTS

| | | | | |
|---|---|---|---|---|
| 2005/0060469 A1* | 3/2005 | Feng | ...................... | G11C 5/066 710/305 |
| 2009/0267643 A1* | 10/2009 | Lewis | ...................... | G06F 7/506 326/38 |
| 2010/0060310 A1* | 3/2010 | Laisne | ................ | H01L 25/0657 326/10 |
| 2011/0134705 A1* | 6/2011 | Jones | ................... | H04N 21/426 365/189.02 |
| 2013/0007414 A1* | 1/2013 | Sharma | ............... | G06F 13/4282 712/38 |
| 2013/0054849 A1* | 2/2013 | Loh | ...................... | G06F 13/4265 710/100 |
| 2013/0163605 A1* | 6/2013 | Chandra | ................. | H04L 49/35 370/402 |
| 2013/0205053 A1* | 8/2013 | Harriman | ............ | G06F 13/4022 710/105 |
| 2014/0098617 A1* | 4/2014 | Jones | ...................... | G11C 7/10 365/189.02 |
| 2014/0122560 A1* | 5/2014 | Ramey | ................. | H04L 67/1008 709/201 |
| 2014/0372663 A1* | 12/2014 | Chandra | ................ | G06F 13/385 710/316 |
| 2015/0032917 A1* | 1/2015 | Nguyen | ............. | G06F 13/4072 710/51 |
| 2015/0039787 A1* | 2/2015 | Voorhees | ............. | G06F 3/0604 710/17 |
| 2015/0067206 A1* | 3/2015 | Luo | ..................... | G06F 13/4282 710/105 |
| 2015/0121115 A1* | 4/2015 | Chandra | ................ | G06F 13/4022 713/400 |
| 2015/0370736 A1* | 12/2015 | Brown | .................... | G06F 13/14 710/116 |
| 2016/0156544 A1* | 6/2016 | Holm | .................... | H04L 65/103 370/389 |
| 2016/0179738 A1* | 6/2016 | Guddeti | ................. | G06F 13/24 714/56 |
| 2019/0007310 A1* | 1/2019 | Das Sharma | ........... | H04L 49/60 |

* cited by examiner

| Lanes | 0 | | 1 | | 2 | | 3 | | ... | 22 | | 23 | | 24 | | 25 | |
|---|---|---|---|---|---|---|---|---|---|---|---|---|---|---|---|---|---|
| Sync Hdr | 0 | | 0 | | 0 | | 0 | | | 0 | | 0 | | 0 | | 0 | |
| | 1 | | 1 | | 1 | | 1 | | | 1 | | 1 | | 1 | | 1 | |
| Symbol 0 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 1 | ProtID[15:8] | | Flit[207:200] | | Flit[215:208] | | Flit[223:216] | | ... | Flit[375:368] | | Flit[383:376] | | Flit[391:384] | | Flit[399:392] | |
| Symbol 2 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 3 | ProtID[15:8] | | Flit[207:200] | | Flit[215:208] | | Flit[223:216] | | ... | Flit[375:368] | | Flit[383:376] | | Flit[391:384] | | Flit[399:392] | |
| Symbol 4 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 5 | ProtID[15:8] | | Flit[207:200] | | Flit[215:208] | | Flit[223:216] | | ... | Flit[375:368] | | Flit[383:376] | | Flit[391:384] | | Flit[399:392] | |
| Symbol 6 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 7 | ProtID[15:8] | | Flit[207:200] | | Flit[215:208] | | Flit[223:216] | | ... | Flit[375:368] | | Flit[383:376] | | Flit[391:384] | | Flit[399:392] | |
| Symbol 8 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 9 | ProtID[15:8] | | Flit[207:200] | | Flit[215:208] | | Flit[223:216] | | ... | Flit[375:368] | | Flit[383:376] | | Flit[391:384] | | Flit[399:392] | |
| Symbol 10 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 11 | ProtID[15:8] | | Flit[207:200] | | Flit[215:208] | | Flit[223:216] | | ... | Flit[375:368] | | Flit[383:376] | | Flit[391:384] | | Flit[399:392] | |
| Symbol 12 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 13 | ProtID[15:8] | | Flit[207:200] | | Flit[215:208] | | Flit[223:216] | | ... | Flit[375:368] | | Flit[383:376] | | Flit[391:384] | | Flit[399:392] | |
| Symbol 14 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 15 | ProtID[15:8] | | Flit[207:200] | | Flit[215:208] | | Flit[223:216] | | ... | Flit[375:368] | | Flit[383:376] | | Flit[391:384] | | Flit[399:392] | |
| Sync Hdr | 0 | | 0 | | 0 | | 0 | | | 0 | | 0 | | 0 | | 0 | |
| | 1 | | 1 | | 1 | | 1 | | | 1 | | 1 | | 1 | | 1 | |
| Symbol 0 | ProtID[7:0] | | Flit[7:0] | | Flit[15:8] | | Flit[23:16] | | ... | Flit[175:168] | | Flit[183:176] | | Flit[191:184] | | Flit[199:192] | |
| Symbol 1 | ProtID[15:8] | | Flit[207:200] | | Flit[215:208] | | Flit[223:216] | | ... | Flit[375:368] | | Flit[383:376] | | Flit[391:384] | | Flit[399:392] | |
| ... | ... | | ... | | ... | | ... | | ... | ... | | ... | | ... | | ... | |

*FIG. 8A*

| Lanes | 0 | 1 | 2 | 3 | 4 | 5 | 12 | 13 | 14 | 15 |
|---|---|---|---|---|---|---|---|---|---|---|
| Sync Hdr | 0 | 0 | 0 | 0 | 0 | 0 | 0 | 0 | 0 | 0 |
|  | 1 | 1 | 1 | 1 | 1 | 1 | 1 | 1 | 1 | 1 |
| Symbol 0 | ProtID[7:0] | ProtID[15:8] | Flit[7:0] | Flit[15:8] | Flit[23:16] | Flit[31:24] | Flit[87:80] | Flit[95:88] | Flit[103:96] | Flit[111:104] |
| Symbol 1 | Flit[119:112] | Flit[127:120] | Flit[135:128] | Flit[143:136] | Flit[151:144] | Flit[159:152] | Flit[215:208] | Flit[223:216] | Flit[231:224] | Flit[239:232] |
| Symbol 2 | Flit[247:240] | Flit[255:248] | Flit[263:256] | Flit[271:264] | Flit[279:272] | Flit[287:280] | Flit[343:336] | Flit[351:344] | Flit[359:352] | Flit[367:360] |
| Symbol 3 | Flit[375:368] | Flit[383:376] | Flit[391:384] | Flit[399:392] | ProtID[7:0] | ProtID[15:8] | Flit[55:48] | Flit[63:56] | Flit[71:64] | Flit[79:72] |
| Symbol 4 | Flit[87:80] | Flit[95:88] | Flit[103:96] | Flit[111:104] | Flit[119:112] | Flit[127:120] | Flit[183:176] | Flit[191:184] | Flit[199:192] | Flit[207:200] |
| Symbol 5 | Flit[215:208] | Flit[223:216] | Flit[231:224] | Flit[239:232] | Flit[247:240] | Flit[255:248] | Flit[311:304] | Flit[319:312] | Flit[327:320] | Flit[335:328] |
| Symbol 6 | Flit[343:336] | Flit[351:344] | Flit[359:352] | Flit[367:360] | Flit[375:368] | Flit[383:376] | Flit[23:16] | Flit[31:24] | Flit[39:32] | Flit[47:40] |
| Symbol 7 | Flit[55:48] | Flit[63:56] | Flit[71:64] | Flit[79:72] | Flit[87:80] | Flit[95:88] | Flit[151:144] | Flit[159:152] | Flit[167:160] | Flit[175:168] |
| Symbol 8 | Flit[183:176] | Flit[191:184] | Flit[199:192] | Flit[207:200] | Flit[215:208] | Flit[223:216] | Flit[279:272] | Flit[287:280] | Flit[295:288] | Flit[303:296] |
| Symbol 9 | Flit[311:304] | Flit[319:312] | Flit[327:320] | Flit[335:328] | Flit[343:336] | Flit[351:344] | ProtID[7:0] | ProtID[15:8] | Flit[7:0] | Flit[15:8] |
| Symbol 10 | Flit[23:16] | Flit[31:24] | Flit[39:32] | Flit[47:40] | Flit[119:112] | Flit[127:120] | Flit[119:112] | Flit[127:120] | Flit[135:128] | Flit[143:136] |
| Symbol 11 | Flit[151:144] | Flit[159:152] | Flit[167:160] | Flit[175:168] | Flit[183:176] | Flit[191:184] | Flit[247:240] | Flit[255:248] | Flit[263:256] | Flit[271:264] |
| Symbol 12 | Flit[279:272] | Flit[287:280] | Flit[295:288] | Flit[303:296] | Flit[311:304] | Flit[319:312] | Flit[375:368] | Flit[383:376] | Flit[391:384] | Flit[399:392] |
| Symbol 13 | ProtID[7:0] | ProtID[15:8] | Flit[7:0] | Flit[15:8] | Flit[23:16] | Flit[31:24] | Flit[87:80] | Flit[95:88] | Flit[103:96] | Flit[111:104] |
| Symbol 14 | Flit[119:112] | Flit[127:120] | Flit[135:128] | Flit[143:136] | Flit[151:144] | Flit[159:152] | Flit[215:208] | Flit[223:216] | Flit[231:224] | Flit[239:232] |
| Symbol 15 | Flit[247:240] | Flit[255:248] | Flit[263:256] | Flit[271:264] | Flit[279:272] | Flit[287:280] | Flit[343:336] | Flit[351:344] | Flit[359:352] | Flit[367:360] |
| Sync Hdr | 0 | 0 | 0 | 0 | 1 | 1 | 0 | 0 | 0 | 1 |
|  | 1 | 1 | 1 | 1 | 0 | 0 | 1 | 1 | 1 | 0 |
| Symbol 0 | Flit[375:368] | Flit[383:376] | Flit[391:384] | Flit[399:392] | ProtID[7:0] | ProtID[15:8] | Flit[55:48] | Flit[63:56] | Flit[71:64] | Flit[79:72] |
| Symbol 1 | Flit[87:80] | Flit[95:88] | Flit[103:96] | Flit[111:104] | Flit[119:112] | Flit[127:120] | Flit[183:176] | Flit[191:184] | Flit[199:192] | Flit[207:200] |

*FIG. 8B*

TECHNIQUES TO SUPPORT MULTIPLE PROTOCOLS BETWEEN COMPUTER SYSTEM INTERCONNECTS

TECHNICAL FIELD

Embodiments described herein generally relate to information processing and, more specifically, but not exclusively, to multi-protocol support of computer system interfaces.

BACKGROUND

Computing systems typically include multiple interconnects to facilitate communication between system components, such as processors and memory. In addition, interconnects may also be used to support add-on devices, for instance, input/output (TO) devices and expansion cards. Furthermore, different market segments need different interconnect architectures to suit the market's needs and different interconnect connections. Non-limiting examples of typical interconnects may include peripheral component interconnect express (PO), intra-device interconnect (IDI), and Intel® ultra-path interconnect (UPI or Intel® UPI).

The complexity of the interconnect architecture required to couple and communicate between components of conventional computing systems has increased substantially in order to meet bandwidth and latency requirements for optimal component operation. Integrated circuits may often include protocol stacks for each type of interconnect communication that are designed directly into the chip at the time of manufacture. As a result, system developers do not have the flexibility to modify the interconnect interfaces and capabilities of an integrated circuit to suit their particular needs without time consuming and cost-prohibitive redesigns prior to fabrication.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 8A illustrates an example multi-interconnect protocol according to a first embodiment.

FIG. 8B illustrates an example multi-interconnect protocol according to a second embodiment

DETAILED DESCRIPTION

Figure 1:
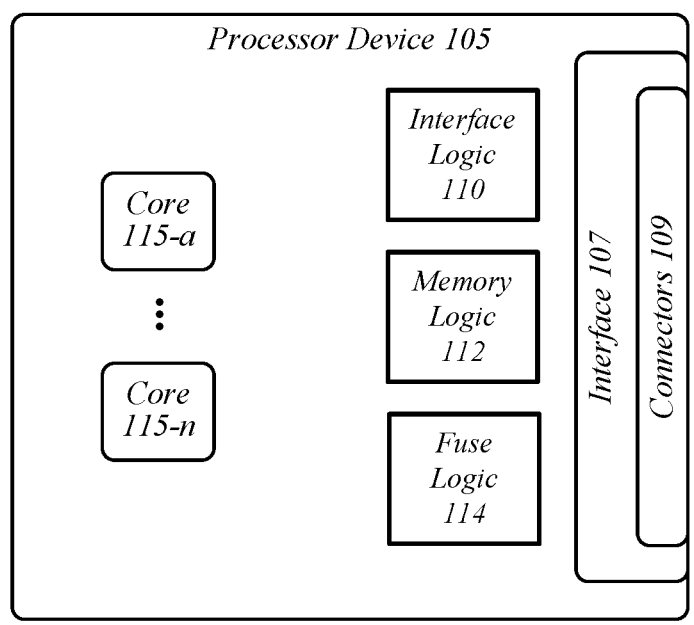
FIG. 1 illustrates an example of a first operating environment.

Various embodiments may be generally directed to providing support for multiple interconnect protocols for a computing device component. In some embodiments, a multi-protocol stack may be used to provide support for multiple interconnect protocols. The multi-protocol stack may operate to dynamically multiplex between different protocol stacks received at an internal and/or external link of the computing device component. In various embodiments, the multi-protocol stack may include an on-package configuration and an off-package configuration. In general, on-package may refer to interconnect interfaces and/or communication that occurs within a component package, such as within elements of an integrated circuit die substrate used to form the component. Off-package may generally refer to interconnect interfaces and/or communication between a component package and a separate component, for instance, between an integrated circuit package and an external input/output (TO) card.

In a non-limiting example, an embodiment may include an apparatus for providing multi-interconnect protocol communication. The apparatus may include a component having a plurality of on-package devices, at least one on-package interconnect between at least a portion of the plurality of on-package devices, at least one off-package interconnect between the component and at least one off-package device, and interface logic, at least a portion of the interface logic comprised in hardware, the interface logic to determine data to be communicated, route the data using a multi-interconnect protocol via the at least one on-package interconnect for communication between the plurality of on-package devices, and route the data using a standard interconnect protocol via the at least one off-package interconnect for communication between the plurality of on-package devices and the at least one off-package. Embodiments are not limited in this context. These and other details will become more apparent in the following description.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

FIG. 1 illustrates an example of an operating environment 100 that may be representative of various embodiments. Operating environment 100 depicted in FIG. 1 illustrates a general overview of a processor device 105 which may be part of a system according to some embodiments, such as a computer system, compute system, networking system, distributed system, and/or the like configured for multi-protocol support according to some embodiments. In various instances, processor device 105 may be any type of computational element, such as but not limited to, a microprocessor, a processor, central processing unit, digital signal processing unit, dual-core processor, a quad-core processor, a multi-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, a field-programmable gate array (FPGA) circuit, application specific integrated circuit (ASIC) or any other type of processor or processing circuit on a single chip or integrated circuit. Processor device 105 may have a number of elements, including one or more cores 115a-n, interface logic 110, memory logic 112, fuse logic 114, and one or more interfaces 107 having a number of connectors 109.

In the illustrated example, processor device 105 includes a plurality of cores 115a-n. However, embodiments are not limited in this manner, and processor device 105 may include any number of cores, including a single core. Moreover, the multiple core design can integrate different types of processor cores on the same integrated circuit (IC) die, (for instance, in a heterogeneous design). Thus, one or more cores 115a-n may be different from each other. In some instances, each core of a multiple core design may be the same (for instance, in a homogeneous design).

Cores 115a-n of processor device 105 can read and execute program instructions. The instructions are typically central processing unit (CPU) instructions (such as add, move data, and branch). The multiple core design enables the processor device 105 to execute or run multiple instructions at the same time, increasing overall speed for programs and applications. In some instances, cores 115a-n may be integrated onto a single integrated circuit die (known as a chip multiprocessor or CMP), or onto multiple dies in a single chip package. Also, processor device 105 with a multiple core design can be implemented as symmetrical or asymmetrical multiprocessors.

In some embodiments, processor device 105 may include an interface 107 and connectors 109. Connectors 109 and interface 107 may provide physical connections to couple with other devices, such as interface components, memory, processing cards, networking interface components, accelerator cards, and so forth. Interface 107 and connectors 109 can include one or more wires, bumps, pins, or signal traces capable of communicating information and data via electrical signaling. In some instances, interface 107 and connectors 109 may be coupled with a physical slot capable of accepting processing cards. These processing cards typically provide additional processing and memory, which may be directed to a specific task, for instance, graphics processing, network processing, storage processing, interface processing, and/or the like. In some embodiments, interface 107 and connectors 109 may provide a common set of pins that support communication via a number of interconnect protocols.

In some embodiments, interface 107 and connectors 109 may be part of and enable one or more interconnects or logical links to send and receive data. The information and data communicated via the interconnect and the logical links may include data, control messages, interrupts, and so forth. Such interconnects may include a number of lanes, such as signaling pairs, and each lane may be made up of a plurality of wires (for instance, four wires) or signal traces of connectors 109 to send and receive data with another device, for example. Embodiments are not limited in this context. For instance, each connector 109 may be coupled to a single wire or trace and four connectors 109 may make up a lane. In one example, interface 107 may include a total of twenty-six lanes to communicate data with another device. However, embodiments are not limited in this manner, and an interface may include more or fewer lanes based, for example, on computing requirements.

Processor device 105 may include interface logic 110 to enable and cause communication of data via interface 107 in accordance with one or more interconnect protocols. Supported interconnect protocols may include standard load/store IO protocols for component communication, including serial link protocols, device caching protocols, memory protocols, memory semantic protocols, directory bit support protocols, networking protocols, coherency protocols, accelerator protocols, data storage protocols, point-to-point protocols, fabric-based protocols, on-package (or on-chip) protocols, fabric-based on-package protocols, and/or the like. Non-limiting examples of supported interconnect protocols may include peripheral component interconnect (PCI) protocol, peripheral component interconnect express (PCIe or PCI-E) protocol, universal serial bus (USB) protocol, serial peripheral interface (SPI) protocol, serial AT attachment (SATA) protocol, Intel® QuickPath Interconnect (QPI) protocol, Intel® UltraPath Interconnect (UPI) protocol, Intel's® Optimized Accelerator Protocol (OAP), Intel® Accelerator Link (IAL), intra-device interconnect (IDI) protocol, Intel® On-Chip Scalable Fabric (IOSF) protocol, scalable memory interconnect (SMI) protocol, SMI 3rd generation (SMI3), and/or the like.

Although UPI and/or QPI are used as illustrative point-to-point protocols, embodiments are not so limited, as any type of point-to-point protocol capable of operating according to some embodiments is contemplated herein. In addition, embodiments are not limited to IOSF as a fabric-based protocol, on-package protocol, or fabric-based on-package protocol, as IOSF is used for illustrative purposes; indeed, any type of fabric-based protocol, on-package protocol, or fabric-based on-package protocol capable of operating according to some embodiments may be used.

In some embodiments, interface logic 110 may include a multi-protocol multiplexer (see, for example, FIG. 4) such that processor device 105 and/or components thereof may support multiple conventional, "native," or "standard" protocol stacks (for instance, PCIE, UPI, and/or the like) and a multi-protocol stack (see, for example, FIG. 4) for both on-package and off-package communications. In various embodiments, the multi-protocol multiplexer may be programmed by a user or a computer system statically, or dynamically. In some embodiments, the programming may occur by setting one or more fuses via fuse logic 114 to configure interface logic 110, for example. In some instances, the interface logic 110 may be originally programmed at the time of manufacture, during startup of a computing system, and/or during run-time. Embodiments are not limited in this context. For example, interface logic 110 may be programmed such that multi-protocol multiplexer may operate using a standard protocol stack for off-package communications and the multi-protocol stack for on-package communications. In another example, interface logic 110 may be programmed such that multi-protocol multiplexer may operate using a multi-protocol stack, for instance, via the off-package pins.

In some embodiments, processor device 105 may include memory logic 112, such as coherency and cache logic. Memory logic 112 may perform operations for a memory of processor device 105, such as a cache, or a different memory not on the same die as the processor device 105, for example. Memory logic 112 may enable a device coupled to interface 107 via connectors 109 to read and write data to and from memory. In some embodiments, memory logic 112 may enable a coherency protocol for memory usage of cores 115a-n of processor device 105. Since there may be two or more processing elements or cores 115a-n working at the same time, it is possible that they simultaneously access the same memory location of a cache. If one of cores 115a-n changes data in a memory location, memory logic 112 may notify all the other cores 115a-n of changes to shared values in memory, for example. Embodiments are not limited in this context, and any one of a number of coherency protocols may be utilized by memory logic 112.

In various embodiments, processor device 105 may include fuse logic 114. Fuse logic 114 may be on package (or on-die) of processor device 105 and may be user-programmable. For example, fuse logic 114 may be coupled to a fuse mapping to individual fuse buses to interact and program one or more fuses. The fuses may be set and may control, among other things, operation of the multi-protocol multiplexer as provided by the interface logic 110 for each of the one or more connectors 109. Fuse logic 114 may program one or more fuses based on user input. For example, the fuses to configure the multi-protocol multiplexer for the interface logic 110 may be programmed by a user at the time of manufacturer and/or during run-time. In another example, a user may program the fuses to configure the multi-protocol multiplexer for the interface logic 110 via at least one of a BIOS, an operating system (OS), and/or an application. Fuse logic 114 may also program one or more fuses to configure the multi-protocol multiplexer based on signals received from the BIOS, an application, and/or an os directly. In some instances, a discovery operation may occur to detect a device or a card to configure interface logic 110. The discovery operation may include automatically detecting a card or device plugged into a slot, for example. In another example, platform straps may be used to determine a configuration of interface logic 110. The platform straps may include detecting signalling on one or more pins during a bootup, for example.

Figure 2:
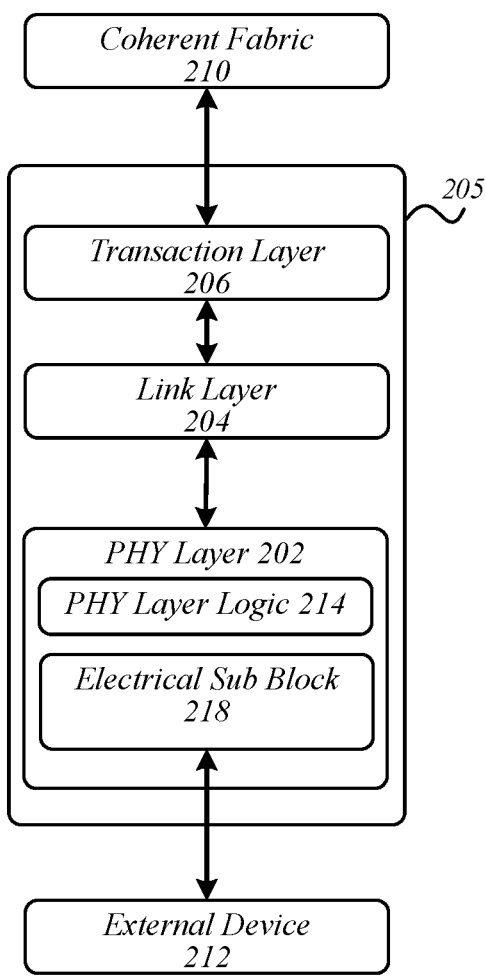
FIG. 2 illustrates an example of a second operating environment.

FIG. 2 illustrates an example of an operating environment 200 that may be representative of various embodiments. Operating environment 200 depicted in FIG. 2 illustrates an embodiment of an interconnect protocol stack 200. In general, interconnect protocol stack 200 may generally include or represent interconnect protocols used by a multi-protocol system according to some embodiments, including, without limitation, PCIe, IDI, SMI3, UPI, IOSF, and/or the like. Embodiments are not limited in this context.

Interconnect protocol stack 200 may include a number of layers, such as a transaction layer 202, a link layer 204, and a physical layer (PHY) 206. In various embodiments, portions of interconnect protocol stack 200 may be implemented as part of interface logic 110, interface 107, connectors 109, or any combination thereof. However, embodiments are not limited in this manner, and portions of interconnect protocol stack 200 may be implemented in different elements of processor device 105.

In some embodiments, interconnect protocol stack 200 and interconnect protocols may communicate data between a coherent fabric 210 and a device. Coherent fabric 210 may connect and include cores 115*a-n*, memory logic 112, memory, a processor cache, and so forth with interface logic 110. Transaction layer 206 may handle data and action requests and messages. Transaction layer 206 may parse the action requests and messages and initiate the appropriate actions in the processor's memory system according to protocol specific rules, such as ordering rules. Transaction layer 206 may also process data and action requests which may include read and write instructions. Action requests may also include cache coherency actions for UPI and OAP, for example, and address transaction actions for PCIe, for example. The messages processed by transaction layer 206 may include error messages, interrupts, and/or the like.

Transaction layer 206 may provide an interface between cores 115*a-n*, and interconnect architecture including at least portions of PHY layer 202, which may include interface 107, and connectors 109 coupled to another device. Transaction layer 206 may also communicate information between cores 115*a-n* and the processor's memory system and another device via link layer 204 and PHY layer 202 in transaction layer packets (TLPs). As mentioned, this information may include memory reads, memory writes, input/output (I/O), I/O writes, messages, completion, and so forth.

Link layer 204, also referred to as a data link layer, may operate as an intermediate stage between transaction layer 206 and PHY 202. In one embodiment, link layer 204 may provide a reliable mechanism for exchanging TLPs between two components in a link. Link layer 204 may append information, for instance, packet sequence identification, to the TLPs when sending data and may remove the information from packets when receiving data. Link layer 204 may also determine and append an error detection code (CRC) to the packet header/payload of the TLPs. Link layer 204 may send the modified TLPs to PHY 206 for transmission across a physical link, for example, interface 107 and connectors 109, to an external device.

In one embodiment, interconnect protocol stack 200 may also include a PHY 202, which may include a logical sub-block 214 and an electrical sub-block 218 to physically transmit a packet to an external device. In some embodiments, PHY 202 may include portions of interface logic 110, interface 107, and connectors 109 or pins.

In some instances, logical sub-block 214 may be divided into a media access control (MAC) sublayer and a physical coding sublayer (PCS). In some instances, the PHY Interface for PCI Express (PIPE), published by Intel® Corp., defines the MAC/PCS functional partitioning and the interface between these two sub-layers. The PIPE specification also identifies the physical media attachment (PMA) layer, which includes the serializer/deserializer (SerDes) circuitry and other analog circuitry.

Logical sub-block 214 may also be responsible for the logical functions of PHY 202. Logical sub-block 214 may include a buffer that may function either as a drift buffer or an elastic buffer. Further, logical sub-block 214 may include a data encoding section, which can encode data using a 128b/130b transmission code, where 130-bit symbols are transmitted/received. In some embodiments, logical sub-block 214 includes a transmit section to prepare outgoing information for transmission by electrical sub-block 218, and a receiver section to identify and prepare received information before passing it to link layer 204. Electrical sub-block 218 includes a transmitter and a receiver to send and receive data. The transmitter is supplied by logical sub-block 214 with symbols and transmits on to an external device. The receiver is supplied with symbols from an external device and transforms the received signals into a bit-stream. The bit-stream is supplied to logical sub-block 214.

Figure 3:
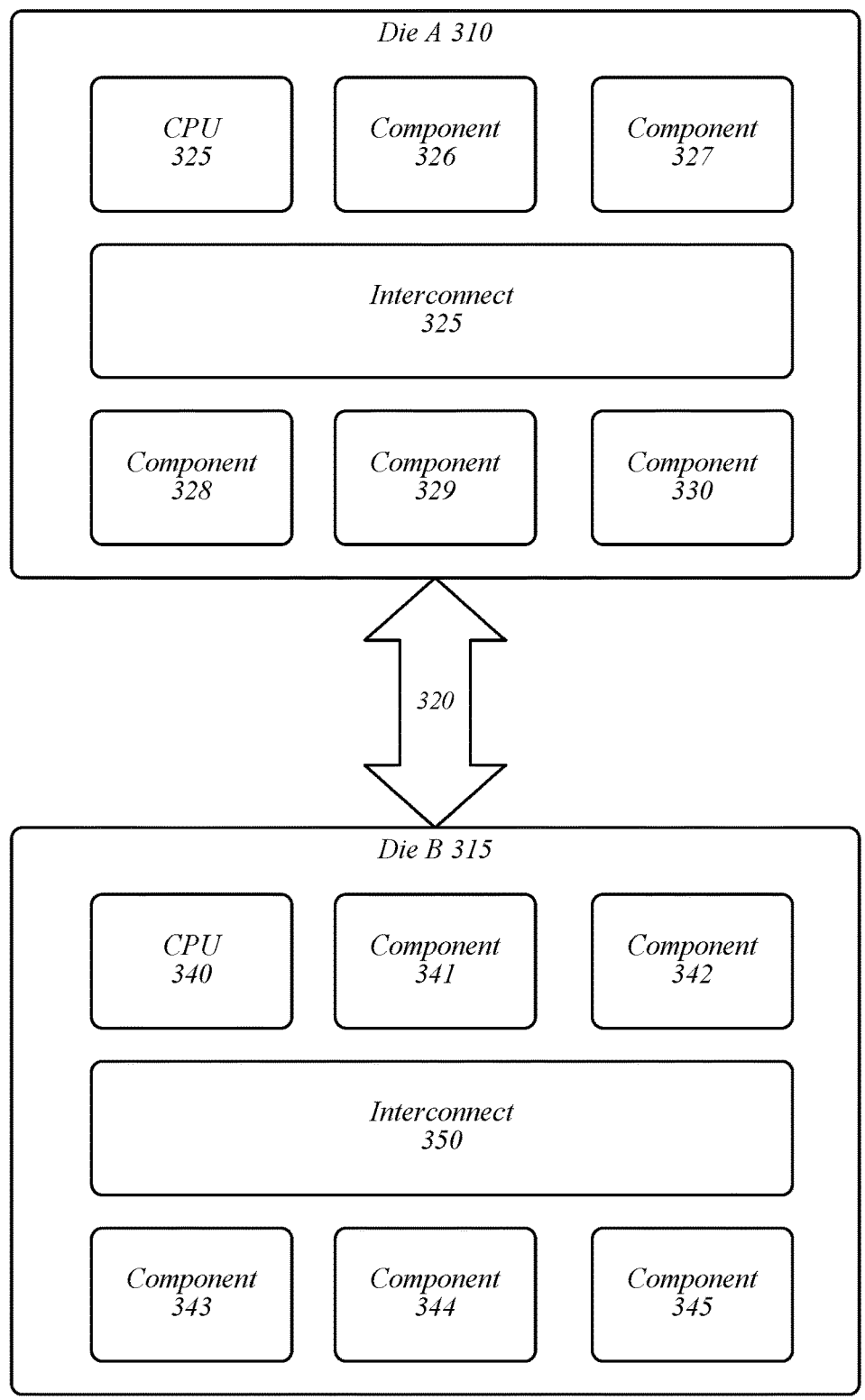
FIG. 3 illustrates an example of a third operating environment.

FIG. 3 illustrates an example of an operating environment 300 that may be representative of various embodiments. Operating environment 300 depicted in FIG. 3 illustrates a simplified block diagram 300 of two or more chips, or dies, (e.g., 310, 315) communicatively connected via a link 320. In some embodiments, dies 310 and 315 may be a multi-chip package communicatively coupled via a multi-chip package link (MCPL) 320. In some embodiments, dies 310 and 315 may be individual components communicatively coupled, for instance, via a SerDes link 320. Embodiments are not limited in this context. For example, while FIG. 3 illustrates an example of two (or more) dies that are interconnected using an example MCPL 320, it should be appreciated that the principles and features described herein regarding implementations of an MCPL can be applied to any interconnect or link connecting a die (e.g., 310) and other components, including connecting two or more dies (e.g., 310, 315), connecting a die (or chip) to another component off-package (or "off-die"), connecting a die to another device or die off-package (e.g., 305), connecting a die to a BGA package, implementation of a Patch on Interposer (POINT), among potentially other examples.

Generally, a multichip package can be an electronic package where multiple integrated circuits (ICs), semiconductor dies or other discrete components (e.g., 310, 315) are packaged onto a unifying substrate (e.g., silicon or other semiconductor substrate), facilitating the combined components' use as a single component (e.g., as though a larger IC). In some instances, the larger components (e.g., dies 310, 315) can themselves be IC systems, such as systems on chip (SoC), multiprocessor chips, or other components that include multiple components (e.g., 325-330 and 340-345) on the device, for instance, on a single die (e.g., 310, 315). Multichip packages can provide flexibility for building complex and varied systems from potentially multiple discrete components and systems. For instance, each of dies 310, 315 may be manufactured or otherwise provided by two different entities, with the silicon substrate of the package provided by yet a third entity, among many other examples. Further, dies and other components within a multichip package can themselves include interconnect or other communication fabrics (for example, 335, 350) providing the infrastructure for communication between components (for example, 325-330 and 340-345) within the device (or "on-package") (for example, 310, 315 respectively). The various components and interconnects (for example, 335, 350) may potentially support or use multiple different protocols. Further, communication between dies (for example, 310, 315) can potentially include transactions between the various components on the dies over multiple different protocols. Designing mechanisms to provide communication between chips (or dies) on a multichip package can be challenging, with traditional solutions employing highly specialized, expensive, and package-specific solutions based on the specific combinations of components (and desired transactions) sought to be interconnected.

For instance, in some implementations, a high bandwidth, low power, low latency interface can be provided to connect a host device (for example, a CPU) or other device to a companion chip that sits in the same package as the host. Such a multichip package link (MCPL) can support multiple package options, multiple I/O protocols, as well as Reliability, Availability, and Serviceability (RAS) features. Further, the physical layer (PHY) can include a physical electrical layer and logic layer and can support longer channel lengths, including channel lengths up to, and in some cases exceeding, approximately 45 mm. In some implementations, an example MCPL can operate at high data rates, including data rates exceeding 8-10 Gb/s.

In one example implementation of an MCPL, a PHY electrical layer can improve upon traditional multi-channel interconnect solutions (e.g., multi-channel DRAM I/O), extending the data rate and channel configuration, for instance, by a number of features including, as examples, regulated mid-rail termination, low power active crosstalk cancellation, circuit redundancy, per bit duty cycle correction and deskew, line coding, and transmitter equalization, among potentially other examples. In one example implementation of an MCPL, a PHY logical layer can be implemented that can further assist (e.g., electrical layer features) in extending the data rate and channel configuration while also enabling the interconnect to route multiple protocols across the electrical layer. Such implementations can provide and define a modular common physical layer that is protocol agnostic and architected to work with potentially any existing or future interconnect protocol. In one example implementation, a combination of a logical PHY and a physical PHY can also be used as a die-to-die interconnect to connect a serializer-deserializer (SerDes) PHY (for instance, PCIe, Ethernet, Infiniband or other high speed SerDes) on one die (for example, die A 310) to its upper layers that are implemented on another die (for instance, die B 315), among other examples.

Figure 4:
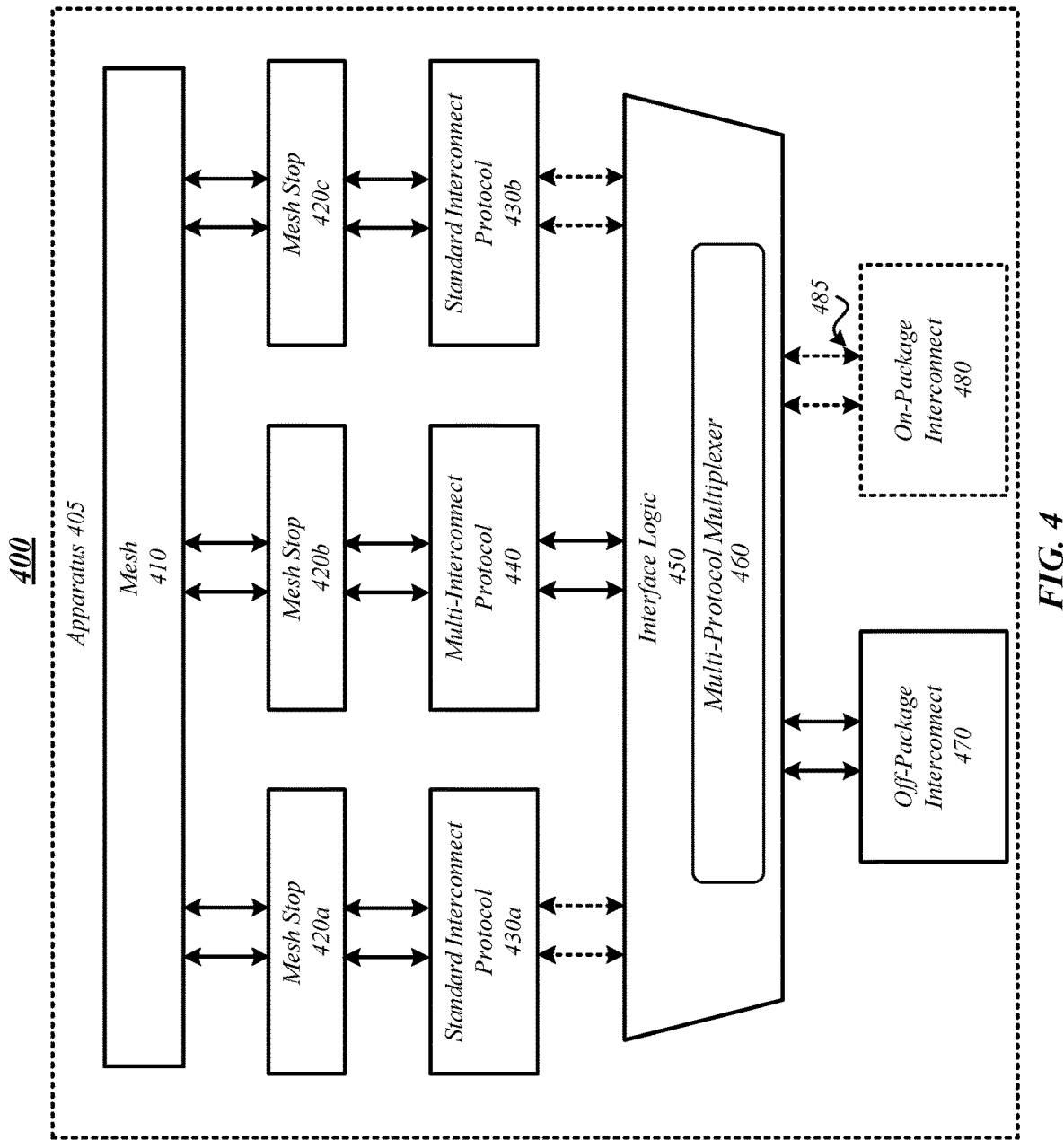
FIG. 4 illustrates an example of a fourth operating environment.

FIG. 4 illustrates an example of an operating environment 400 that may be representative of various embodiments. Operating environment 400 depicted in FIG. 4 illustrates an apparatus 405 implementing a multi-protocol system configured to support multiple interconnect protocols, for instance, on a common set of pins, wires, or other connectors 109 for a processor device 105.

As shown in FIG. 4, interface logic 450 may control and determine communication over one or more interconnect protocols, including standard interconnect protocols 430*a* and 430*b* and/or multi-interconnect protocol 440. Non-limiting examples of standard interconnect protocols 430*a* and 430*b* may include a serial protocol (for instance, PCIe) and/or a point-to-point protocol (for instance, UPI). For instance, standard interconnect protocol 430*a* may include PCIe and standard interconnect protocol 430*b* may include UPI. Multi-interconnect protocol 440 may include a plurality of interconnect protocols. Non-limiting examples, of interconnect protocols of multi-interconnect protocol 440 may include a serial protocol (for instance) PCIe, a point-to-point protocol (for instance, UPI), an intra-device protocol (for instance, IDI), a memory interconnect protocol (for instance, SMI and/or SMI3), a serial protocol/on-package protocol (for instance, PCIe/IOSF), and/or the like. In some embodiments, multi-interconnect protocol 440 may support one or more of UPI, IDI, and/or SMI3 protocols. In some embodiments, multi-interconnect protocol 440 may support each of UPI, IDI, and SMI3 protocols. Embodiments are not limited in this context.

In various embodiments, multi-interconnect protocol 440 may be transmitted using on-package interconnect 480, for instance, via an on-package interconnect such as a single-ended interconnect. In various embodiments, multi-interconnect protocol 440 may be transmitted using off-package interconnect 470, for instance, via off-package pins dedicated to standard interconnect protocols (for example, PCIe and/or UPI). Off-package interconnect 470 may include PHY 202 and/or various interconnects, including, without limitation, PIPE, SerDes, and/or the like.

In some embodiments, interface logic 450 may include a multi-protocol multiplexer (or "mux") 460. In various embodiments, multi-protocol multiplexer 460 may include a static multiplexer. Multi-protocol multiplexer 460 may operate to determine whether off-package interconnect 470 (for instance, via off-package pins) may route data communication using standard interconnect protocol 430*a* and/or 430*b* or multi-interconnect protocol 440. In some embodiments, when multi-interconnect protocol 440 is routed externally (for instance, routed using off-package interconnect 470), the multi-interconnect protocol 440 may not be available via on-package interconnect 480 (for instance, on an on-package link).

In various embodiments, multi-protocol multiplexer 460 may be programmed or otherwise configured to operate using different modes (or operating modes). In some embodiments, interface logic 450 may be programmed by a user or a computer system statically, or dynamically. In some embodiments, the programming may occur by setting one or more fuses to configure interface logic 450. For instance, multi-protocol multiplexer 460 may be configured to operate in a multi-interconnect on-package mode in which standard interconnect protocols 430*a* and/or 430*b* may be used for off-package and multi-interconnect protocol 440 may be used for on-package. In another instance, multi-protocol multiplexer 460 may be configured to operate in a multi-interconnect off-package mode in which multi-interconnect protocol 440 may be used off-package, for instance, via off-package pins of off-package interconnect 470. Accordingly, multi-protocol multiplexer 460 may operate to route data communicated via multi-interconnect protocol 440 on-package when in the multi-interconnect on-package mode and to route data communicated via multi-interconnect protocol 440 off-package when in the multi-interconnect off-package mode. In some embodiments, when multi-interconnect protocol 440 is routed externally off-package (for instance, routed using off-package interconnect 470), the multi-interconnect protocol 440 may not be available on-package (for instance, all multi-interconnect protocol 440 data is routed off-package).

Multi-interconnect protocol 440 may be used off-package (for instance, multi-interconnect off-package mode operation of multi-protocol multiplexer 460) for various purposes. Non-limiting examples of usage of multi-interconnect protocol 440 off-package usage may include at least the following: memory and/or IO disaggregation, for instance, to enable separate upgrade cycles between memory, IO, and compute; coherent accelerator, for example, with its associated memory accessible by CPU(s); enhanced IO with additional protocol support; flexible usage of pins, for example, UPI pins may be re-purposed for PCIe and vice versa; delivery of higher-bandwidth than standard protocol bandwidths, for example, having a "turbo mode" with a wider bus for x16 PCIe.

In some embodiments, one or more mesh stops 420*a-c* may act as a tempory buffer for communications entering and leaving mesh 410. For example, information or data may be received at the mesh stops 420*a-c* for communication to a coupled device or component. The information or data may be processed in accordance with the appropriate protocol, such as standard interconnect protocols 430*a* or 430*b* and/or multi-interconnect protocol 440. In some embodiments, mesh 410 may include one or more cores, such as cores 115*a-n* illustrated in FIG. 1. In various embodiments, portions of standard interconnect protocols 430*a* and 430*b* and/or multi-interconnect protocol 440 may also be implemented in a PHY layer, such as PHY layer 206 or 202 of FIG. 2, although not illustrated in this manner in FIG. 4. In some embodiments, standard interconnect protocols 430*a* and 430*b* and/or multi-interconnect protocol 440 may also be implement in a link layer and a transaction layer, such as those depicted in FIG. 2. In various embodiments, a multi-protocol system may use separate protocol stacks of standard interconnect protocols 430*a* and 430*b* and/or multi-interconnect protocol 440, including separate link layers for each protocol, but a common on-package and a common off-package PHY layer.

Figure 5:
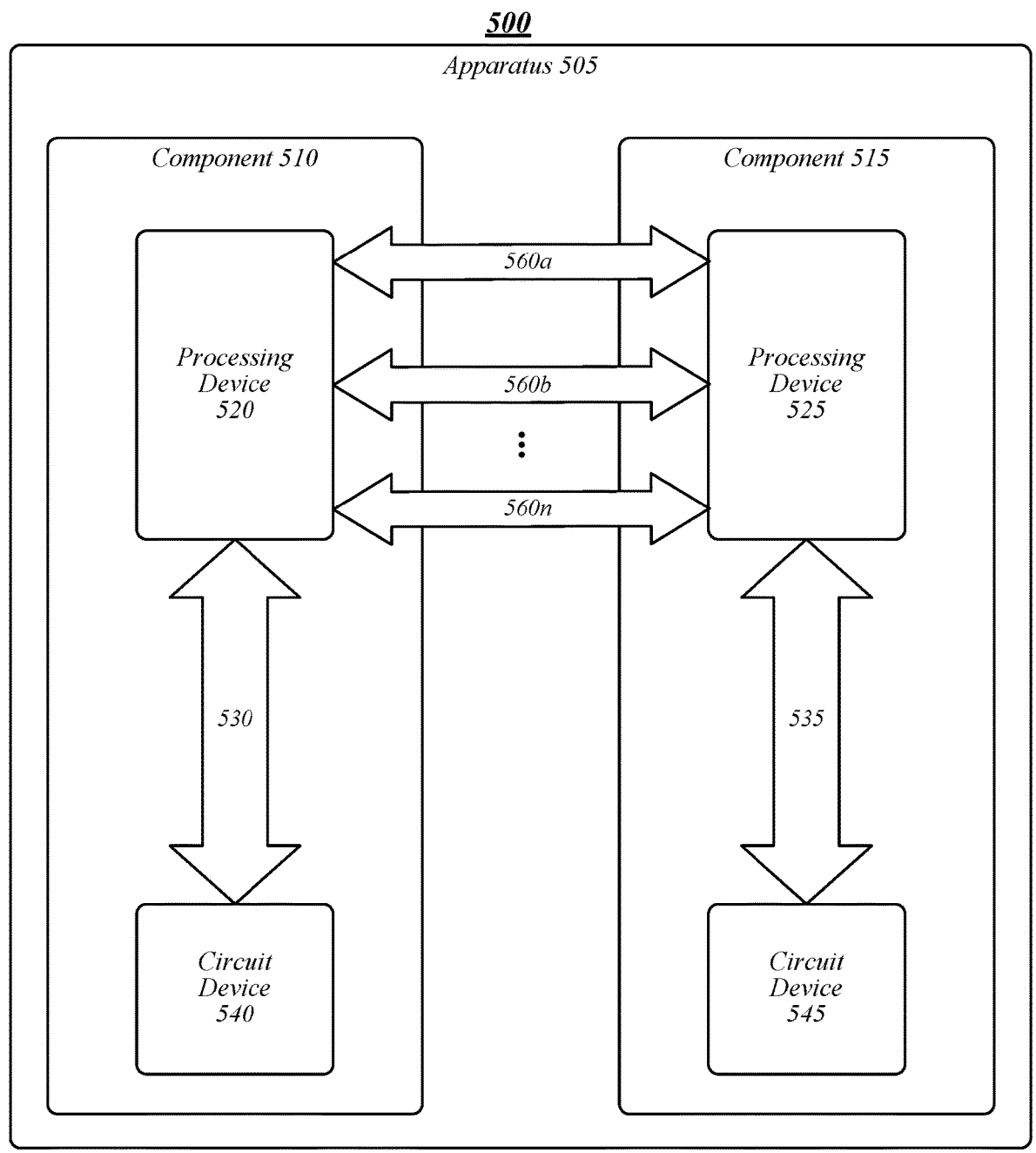
FIG. 5 illustrates an example of a fifth operating environment.

FIG. 5 illustrates an example of an operating environment 500 that may be representative of various embodiments. Operating environment 500 illustrates a multi-protocol system configured to support multiple interconnect protocols according to some embodiments.

As shown in FIG. 5, apparatus 505 may be configured to implement a multi-protocol system that includes component 510 and component 515. Component 510 may include processing device 520 and circuit device 540, and component 515 may include processing device 525 and circuit device 545. Processing device 520 and circuit device 540 are on-package with respect to component 510, and component 515 and components thereof, for instance, processing device 525 and circuit device 545, are off-package with respect to component 510. Processing device 525 and circuit device 545 are on-package with respect to component 515, and component 510 and components thereof, for instance, processing device 520 and circuit device 540, are off-package with respect to component 515. Processing devices 520 and 525 may include various processing devices, such as a central processing unit (CPU), for instance, an Intel® Xeon® CPU. Circuit devices 540 and 545 may include various circuit devices, such as an integrated circuit, including a field-programmable gate array (FPGA).

Off-package communication between component 510 and component 515, and components thereof, such as processing devices 520 and 525, may operate via one or more standard interconnect protocols 560*a-n*. For instance, standard interconnect protocols 560*a-n* may include three lanes, channels, wires, pins, or other communication elements to facilitate UPI communication. On-package communication on component 510, for instance, between processing device 520 and circuit device 540, may operate using a multi-interconnect protocol 530 configured according to some embodiments. Similarly, on-package communication on component 515, for instance, between processing device 525 and circuit device 545, may operate using a multi-interconnect protocol 535 configured according to some embodiments. In some embodiments, multi-interconnect protocol 530 and/or standard interconnect protocols 560*a-n* may use or may include an on-package (or on-chip) communication architecture, interconnect interface, or bus. Although FlexBus may be used as an illustrative on-package interconnect interface in certain examples, embodiments are not so limited, as any type of on-package communication architecture capable of operating according to some embodiments is contemplated herein.

Figure 6:
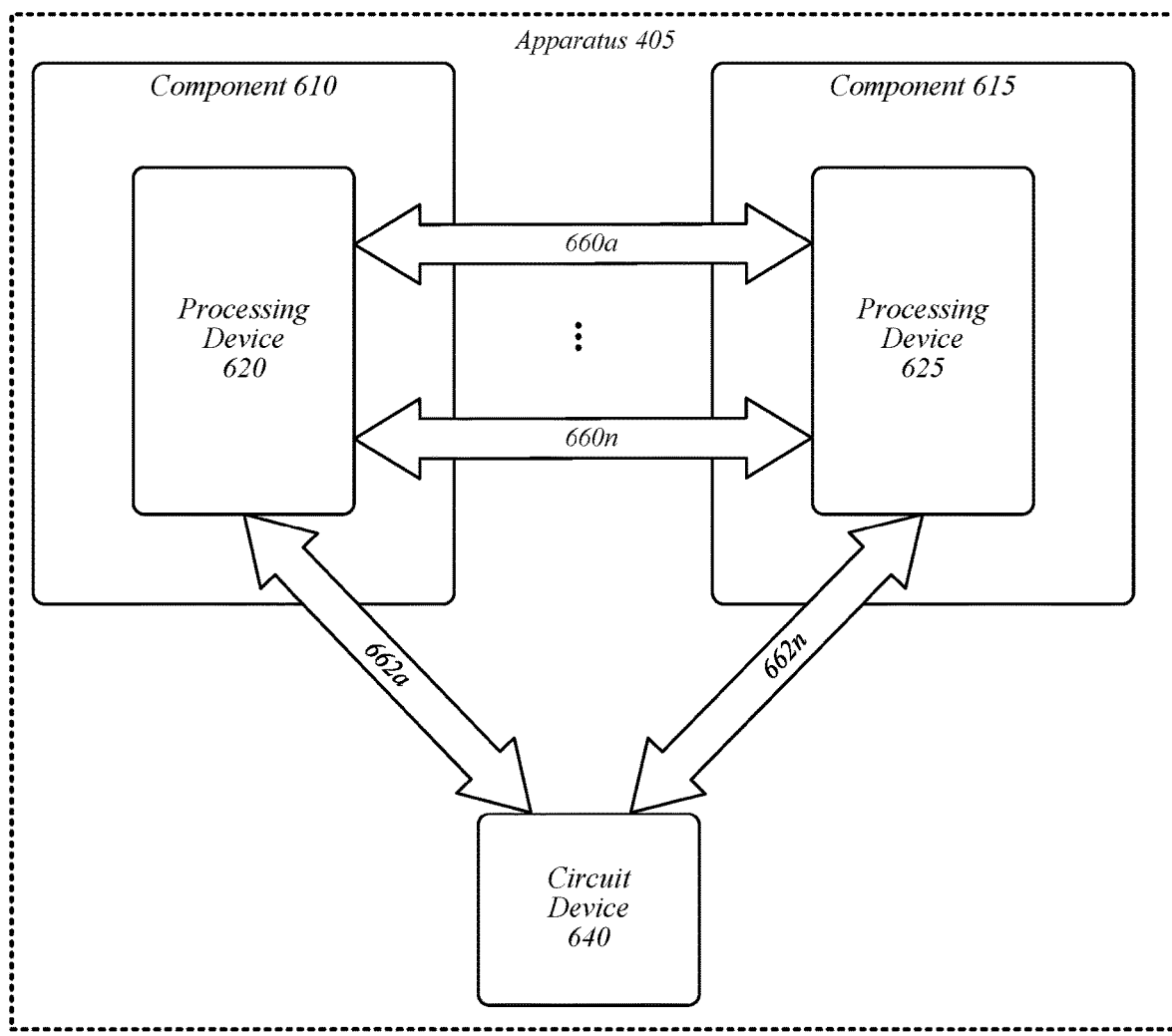
FIG. 6 illustrates an example of a sixth operating environment.

FIG. 6 illustrates an example of an operating environment 600 that may be representative of various embodiments. Operating environment 600 illustrates an apparatus implementing a multi-protocol system configured to support multiple interconnect protocols according to some embodiments.

As shown in FIG. 6, component 610 may include processing device 620 and component 615 may include processing device 625. Processing devices 620 and 625 may include various processing devices, such as a CPU for instance, an Intel® Xeon® CPU. Operating environment 600 may also include circuit device 640, for instance, an FPGA. Circuit device 640 may be off-package with respect to both component 610 and component 615.

In various embodiments, processing device 620 and processing device 625 may be operably coupled to communicate using one or more communication links 660*a-n*. For example, communication links 660*a-n* may include or may use one or more standard interconnect protocols. A non-limiting example of a standard interconnect protocol for communication links 660*a-n* for communication between processing device 620 and processing device 625 may include UPI. In some embodiments, communication links 660*a-n* may include two UPI links. Embodiments are not limited in this context.

In some embodiments, circuit device 640 and component 610 and/or component 615, including elements thereof, such as processing device 620 and processing device 625, may be operably coupled via one or more communication links 662*a*-*n*. In some embodiments, communication links 662*a*-*n* may use or may include a FlexBus interconnect interface. In some embodiments, communication links 662*a*-*n* may include a multi-interconnect protocol 530 configured according to some embodiments. In various embodiments, communication links 662*a*-*n* may include a multi-interconnect protocol over a standard interconnect protocol link, such as, for example, a UPI link. In some embodiments, communication links 662*a*-*n* may be operative over a third UPI link, with communication links 660*a*-*n* being the first and second UPI links.

Figure 7:
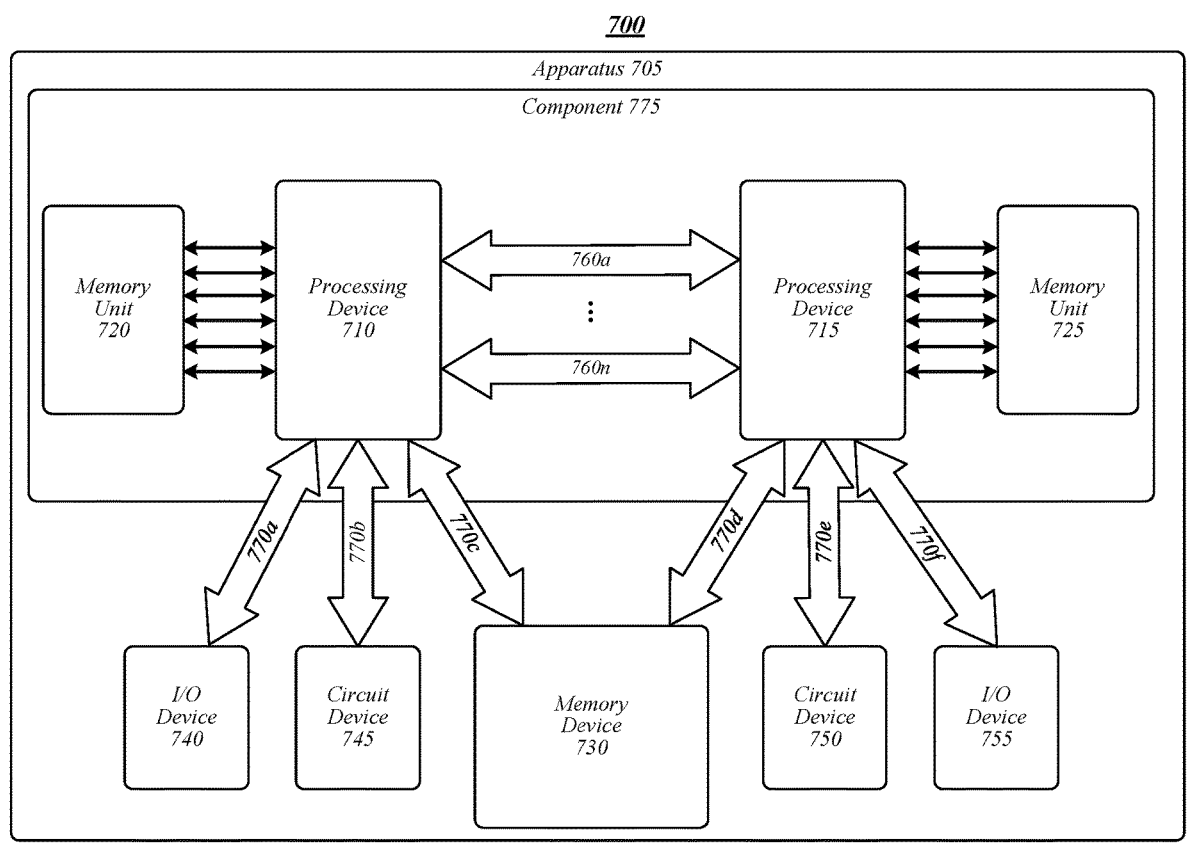
FIG. 7 illustrates an example of a seventh operating environment.

FIG. 7 illustrates an example of an operating environment 700 that may be representative of various embodiments. Operating environment 700 illustrates an apparatus 705 implementing a multi-protocol system configured to support multiple interconnect protocols according to some embodiments.

As shown in FIG. 7, component 775 may include processing device 710 and processing device 715 operably coupled to memory unit 720 and memory unit 725, respectively. In some embodiments, component 775 may include a dual core (or two-socket) processor. In various embodiments, processing device 710 and/or processing device 715 may include a CPU. In some embodiments, memory unit 720 and/or memory unit 725 may include various types of RAM and/or SDRAm, including DDRAM (such as DDRS RAM or SDRAM). Processing device 710 and processing device 715 may be operably coupled via one or more communication links 760*a*-*n*. In some embodiments, communication links 760*a*-*n* may include or use one or more UPI links. In various embodiments, communicating links 760*a*-*n* may include two UPI links.

In operating environment 700, various off-package devices may be operably coupled to component 775 and/or elements thereof, including processing device 710 and/or processing device 715. For example, I/O device 740 may be operably coupled to communicate with processing device 710 via communication link 770*a*, and/or I/O device 755 may be operably coupled to communicate with processing device 720 via communication link 770*f*. In some embodiments, I/O device 740 and/or I/O device 755 may include a Smart 10, HFI, MTS, and/or the like devices or modules. In various embodiments, communication link 770*a* and/or communication link 770*f* may include or may use FlexBus. In some embodiments, communication link 770*a* and/or communication link 770*f* may include or may use a multi-interconnect protocol according to some embodiments, for instance, over a standard communication protocol link. In some embodiments, the standard communication protocol link may include PCIe.

In some embodiments, circuit device 745 may be operably coupled to processing device 710 via communication link 770*b*, and/or circuit device 750 may be operably coupled to processing device 715 via communication link 770*e*. In some embodiments, circuit device 745 and/or circuit device 750 may include an integrated circuit, an FPGA, and/or the like. In various embodiments, communication link 770*a* and/or communication link 770*f* may include or may use FlexBus. In some embodiments, communication link 770*b* and/or communication link 770*e* may include or may use a multi-interconnect protocol according to some embodiments, for instance, over a standard communication protocol link. In some embodiments, the standard communication protocol link may include PCIe.

As shown in FIG. 7, memory device 730 may be operably coupled to communicate with one or both of processing device 710 or processing device 715 via communication link 770*c* and/or communication link 770*d*, respectively. In some embodiments, memory device 730 may include a remote memory device, such as a remote far memory device. In some embodiments, memory device 730 may include a CPU cartridge, for instance, for a 4 skt ring. In various embodiments, communication link 770*c* and/or communication link 770*d* may include a standard interconnect protocol link. In some embodiments, the standard interconnect protocol link may include UPI. In some embodiments, communication link 770*c* and/or communication link 770*d* may include an SMI protocol, such as, for instance, SMI3.

In various embodiments, a multi-protocol system, such as provided in operating environments 400, 500, 600, and/or 700, may be configured to use separate protocol stacks, including their respective link layers, but with a common on-package and a common off-package physical (PHY) layer. In some embodiments, a multi-protocol system may use an indicator element to indicate the protocol type being used. In various embodiments, the indicator element may include a wire (e.g., a dedicated wire) and/or a set of bits on a wire (e.g., a shared wire) operative to receive or transmit an indicator signal. In some embodiments, a protocol indicator may be used to indicate the protocol type being used. In some embodiments, the protocol indicator may include an encoding or other signal transmitted via the indicator element.

In various embodiments, the protocol indicator may include encodings for each protocol that are defined to include error detection and/or error correction properies. For example, if 8 bits are used as a protocol indicator to indicate protocol type for PCIe, IDI, and SMI3 protocols, opcode value OOH may be used to indicate PCIe, OFH to indicate SMI3, and FOH to indicate IDI, with remaining possible opcodes reserved for other and/or future protocols. In some embodiments, a Hamming Distance may be maintained between encodings, for example, to ensure triple-bit flip detection guarantee. In some embodiments, the maintained Hamming Distance may be 4. Other or additional indicators may be used according to some embodiments. For example, an idle indication may be provided via a separate encoding and/or embedded within an existing protocol that supports idle packets (for instance, PCIe, SMI3, and/or the like). In another example, link management packets may be provided via a separate encoding.

The various protocols of a multi-interconnect protocol according to some embodiments may be interleaved, for instance, on fixed-bit intervals. FIG. 8A depicts a table 805 illustrating interleaving of a multi-interconnect protocol over a 26-channel interface, and FIG. 8B depicts a table 810 illustrating interleaving of a multi-interconnect protocol over a 16-channel interface. In some embodiments, table 805 may represent interleaving of a multi-interconnect protocol on a 26-wire FlexBus interface. In some embodiments, wire 0 may be selected to indicate a protocol type and interleave across 16 UI granularity to provide 400-bits (for instance, 25 wires×16 UI) for each protocol being interleaved. In various embodiments, a variable-length payload may be provided for each protocol type. In some embodiments, the variable-length payload may be provided by using one or more encoding indicators. In some embodiments, the encoding indicators may be used to indicate one or more of protocol type, length, and/or error detection code (CRC), for instance, in the initial bits preceding the payload for each packet. In some embodiments, any error in the encoding indicators may result in each protocol stack in a multi-interconnect protocol receiver to invoke a retry mechanism and/or training. For instance, a retry mechanism may include a link level retry mechanism and training may include retraining of the PHY layer to ensure proper delivery of packets.

In various embodiments, off-package interconnects may use an existing PHY, such as PCIe while accounting for widths used according to some embodiments. For instance, for a 26-wide interface (for example, using a 16 GT/s data rate), a PCIe Gen 4 PHY may be extended to a width of 26. A PCIe 128 bit/130 bit encoding may be used along with certain optimizations, such as not using an end-of-data-stream (EDS) token because, for instance, the interface may be guaranteed to operate at widths greater than one. Accordingly, industry-standard PCIe retimers may be used even while not using a PCIe protocol stack. In some embodiments, a receiver may operate with variable-length SKP ordered sets, for instance, to account for independent retimers along the communication path. In some embodiments, an existing PHY may be configured, modified, or otherwise enhanced to provide latency optimization when a retimer is not present, for instance, such as suppressing SKP ordered sets and/or 128/130 bit encoding.

In various embodiments, for industry-standard widths (for example, ×16 and/or ×8 widths), the widest link (for instance, ×26) may be used and a basic unit of transfer (such as 408 bits if packets are sent in 16 UI increments, potentially rounded up to a next 32-bit multiple at 416 bits to reduce the use of muxes) may be overlayed over the 16 (or 8) lanes as depicted in FIG. 8B. In some embodiments, lane 0 may be used to convey protocol ID information and the remaining lanes (15 for ×16 or 7 for ×8) may be used to encode the fundamental packet lengths common across all protocols (for instance, 400 bits in lanes 1-25 for the embodiment depicted in FIG. 8A). In various embodiments, variable-length packets may be supported by, among other things, enhancing STP encoding defined in PCIe to include different protocol support.

As described above, certain embodiments may use Flex-Bus communication links. As FlexBus includes widths wider than PCIe supported widths, some embodiments may facilitate an enhanced (or "turbo") mode for PCIe. For example, in an embodiment employing 26 lanes with 1 lane dedicated to protocol type, the effective PCIe width is ×25, essentially delivering about 56.25% more bandwidth than a conventional ×16 PCIe port with the same speed. In an implementation in which delivery of the entire 56.25% more bandwidth does not occur, for instance, due to limitations of the protocol stack not running at that speed, the extra rate may be negotiated up-front and a rate-limiting logic at the PHY layer may operate to throttle the transmitter to ensure that the effective enhanced (or turbo) bandwidth supported by the receiver is not exceeded.

In various embodiments, a conventional PCIe form factor (for instance, a card electromechanical (CEM) specification connector) such that if a ×16 add-in device is connected to the PCIe form factor (irrespective of whether the PCI form factor supports Flexbus protocols or simply a standard (or "native") PCIE protocol), the add-in device may work in the standard width. For example, extra data pins may be used beyond the pins allotted for the standard ×16 slot.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 9:
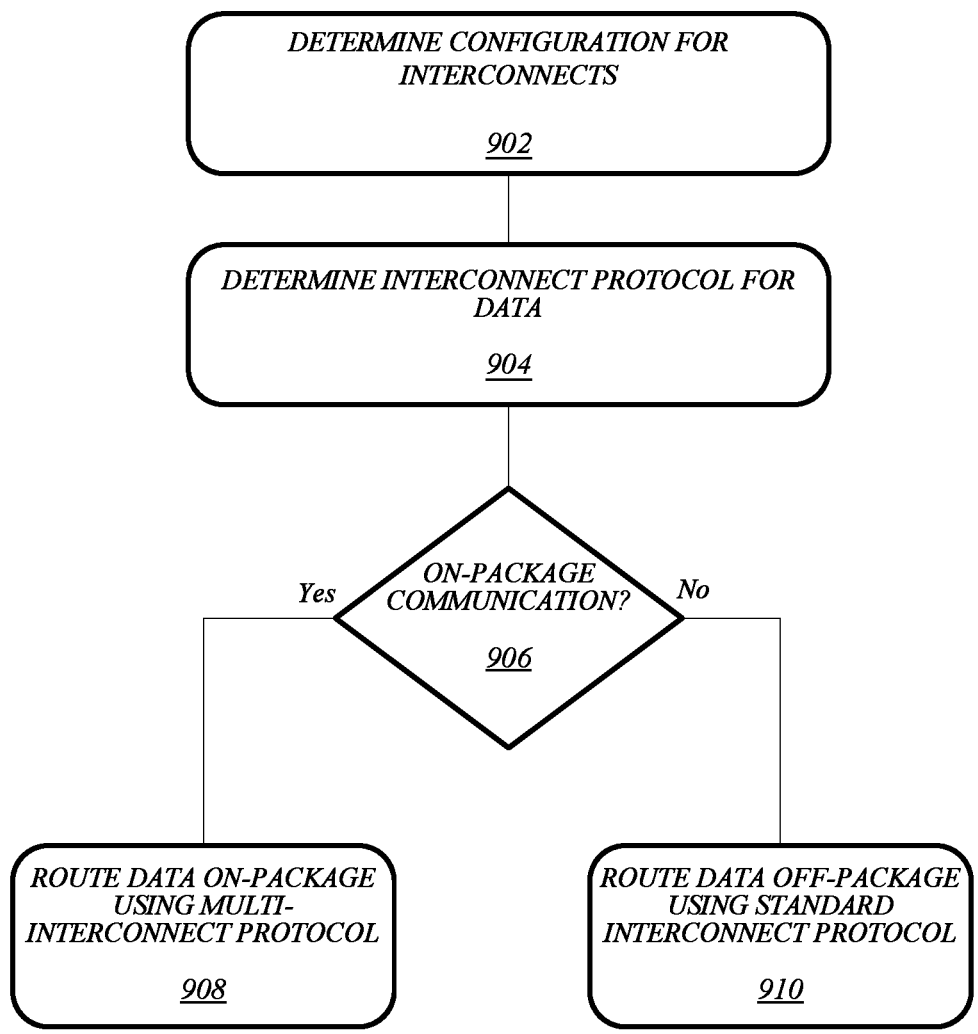
FIG. 9 illustrates an example of a flow diagram.

FIG. 9 illustrates an embodiment of a logic flow 900. The logic flow 900 may be representative of some or all of the operations executed by one or more embodiments described herein, such as apparatus 405, 505, 605, and/or 705. In some embodiments, logic flow 900 may be representative of some or all of the operations of a multi-interconnect protocol communication process.

At block 902, logic flow 900 may determine a configuration for interconnects and which interconnect protocols are active and de-active for one or more connectors. In embodiments, the determination may be made based on the configuration of fuse logic and the setting of one or more fuses. The configuration may also be determined based on a discovery operation performed to detect a card or device coupled with the interconnects. For example, a discovery operation may be performed and detect that a device is a PCIe device, an OAP device, a UPI device, and/or the like. In some embodiments, the configuration may also be determined or detected using platform straps which may include signaling on one or more pins or connectors during a bootup. Logic 904. The interconnect protocol may include various protocols, including, without limitation, PCIe, UPI, QPI, IDI, SMI3, IOSF, SATA, USB, and/or the like.

At block 906, logic flow 900 may determine whether the data is being communicated on-package or off-package. For instance, the data may be communicated off-package from circuit device 640 to processing device 620. In another instance, the data may be communicated on-package from processing device 520 to circuit device 540. If logic flow 900 determines that the data is being communicated on-package at block 906, logic flow may route the data on-package using a multi-interconnect protocol according to some embodiments at block 908. For instance, on-package communication on component 510, for instance, between processing device 520 and circuit device 540, may operate using a multi-interconnect protocol 530 configured according to some embodiments. If logic flow 900 determines that the data is being communicated off-package at block 906, logic flow may route the data off-package using a standard interconnect protocol at block 910. For instance, off-package communication between component 510 and component 515, and components thereof, such as processing devices 520 and 525, may operate via one or more standard interconnect protocols 560a-n. For instance, standard interconnect protocols 560a-n may include three lanes, channels, wires, pins, or other communication elements to facilitate UPI communication.

Figure 10:
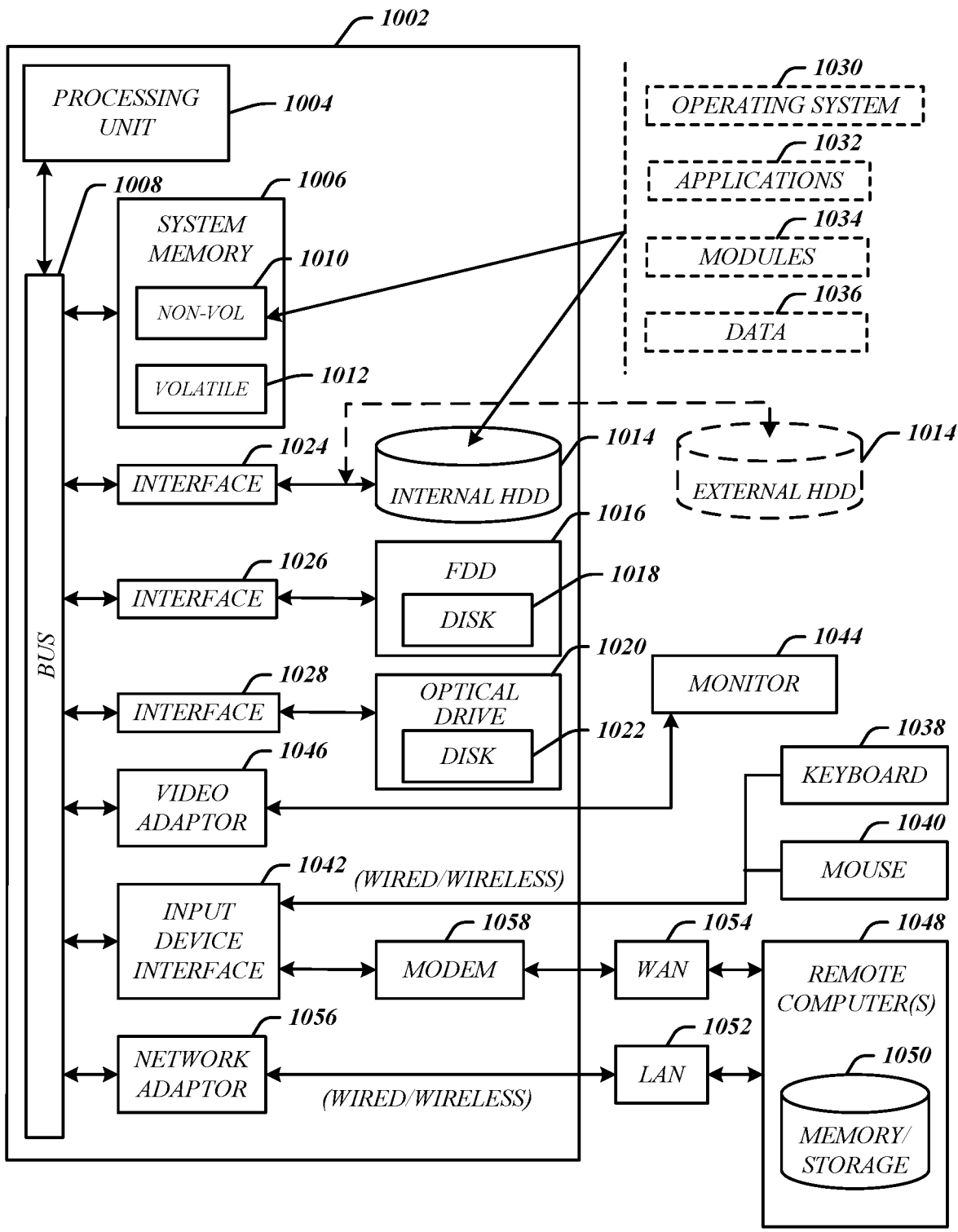
FIG. 10 illustrates an example of a computer architecture.

FIG. 10 illustrates an embodiment of an exemplary computing architecture 1000 suitable for implementing various embodiments as previously described. In one embodiment, the computing architecture 1000 may comprise or be implemented as part one or more systems and devices previously discussed.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, such as those described concerning the processing circuitry is shown in FIG. 1A.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and components of one of apparatus 405, 505, 605, and/or 705.

A user can enter commands and information into the computer 1002 through one or more wired/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or another type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wired and wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN-networking environment, the computer 1002 is connected to the LAN 1052 through a wire and wireless communication network interface or adaptor 1056. The adaptor 1056 can facilitate wire and wireless communications to the LAN 1052, which may also include a wireless access point disposed of thereon for communicating with the wireless functionality of the adaptor 1056.

When used in a WAN-networking environment, the computer 1002 can include a modem 1058, or is connected to a communications server on the WAN 1054, or has other means for establishing communications over the WAN 1054, such as by way of the Internet. The modem 1058, which can be internal or external and a wire and wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed of in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements and components as previously described with reference to FIGS. 1-5 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The following are non-limiting examples according to various embodiments:

Example 1 is an apparatus for providing multi-interconnect protocol communication, the apparatus comprising a component comprising at least one connector operative to connect the component to at least one off-package device via a standard interconnect protocol, and logic, at least a portion of the logic comprised in hardware, the logic to determine data to be communicated via a multi-interconnect protocol, provide the data to a multi-protocol multiplexer to determine a route for the data, route the data on-package responsive to the multi-protocol multiplexer indicating a multi-interconnect on-package mode, and route the data off-package via the at least one connector responsive to the multi-protocol multiplexer indicating a multi-interconnect off-package mode.

Example 2 is the apparatus of Example 1, the multi-protocol multiplexer comprising a static multiplexer.

Example 3 is the apparatus of Example 1, the multi-protocol multiplexer comprising a static multiplexer having an operating mode configured via setting of a fuse.

Example 4 is the apparatus of Example 1, the multi-protocol multiplexer comprising a static multiplexer having an operating mode configured via instruction provided during boot-up of a system comprising the component.

Example 5 is the apparatus of Example 1, the at least one connector comprising at least one of a pin or a bump.

Example 6 is the apparatus of Example 1, the logic to route the data communicated via the multi-interconnect protocol using a standard interconnect protocol physical (PHY) layer of the component.

Example 7 is the apparatus of Example 1, the logic to determine a protocol for transmitting the data based on an indicator element, the protocol comprising one of a standard interconnect protocol or the multi-interconnect protocol.

Example 8 is the apparatus of Example 1, the logic to determine a protocol for transmitting the data based on an indicator element comprising a dedicated wire, the protocol comprising one of a standard interconnect protocol or the multi-interconnect protocol.

Example 9 is the apparatus of Example 1, the logic to determine a protocol for transmitting the data based on an indicator element comprising a set of bits on a shared wire, the protocol comprising one of a standard interconnect protocol or the multi-interconnect protocol.

Example 10 is the apparatus of Example 1, the logic to determine a protocol for transmitting the data based on an encoding transmitted via an indicator element, the protocol comprising one of a standard interconnect protocol or the multi-interconnect protocol.

Example 11 is the apparatus of Example 1, the standard interconnect protocol comprising a serial protocol.

Example 12 is the apparatus of Example 1, the standard interconnect protocol comprising at least one of a serial protocol or a point-to-point protocol.

Example 13 is the apparatus of Example 1, the standard interconnect protocol comprising a peripheral component interconnect express (PCIe) protocol.

Example 14 is the apparatus of Example 1, the multi-interconnect protocol configured to support at least two of a point-to-point protocol, a serial protocol, a memory interconnect protocol, an on-package protocol, an intra-device protocol, or a fabric-based protocol.

Example 15 is the apparatus of Example 1, the multi-interconnect protocol configured to support a memory interconnect protocol, an intra-device protocol, and a serial protocol.

Example 16 is the apparatus of Example 1, the multi-interconnect protocol configured to support an intra-device interconnect (IDI) protocol, a peripheral component interconnect express (PCIe) protocol, and a scalable memory interconnect (SMI) protocol.

Example 17 is the apparatus of Example 1, the standard interconnect protocol comprising at least one of a point-to-point protocol or a peripheral component interconnect express (PCIe) protocol, the multi-interconnect protocol configured to support at least two of a peripheral component interconnect express (PCIe) protocol, a scalable memory interconnect (SMI) protocol, or a fabric-based protocol.

Example 18 is the apparatus of Example 1, the logic to interleave data communicated off-package at fixed-bit intervals.

Example 19 is the apparatus of Example 1, the logic to interleave data off-package at fixed-bit intervals using a specified wire of the at least one connector to indicate a protocol type for the data.

Example 20 is the apparatus of Example 1, the logic to transmit data off-package using a variable-length payload packet.

Example 21 is the apparatus of Example 1, the logic to transmit data off-package using a variable-length payload packet comprising at least one encoding indicator to indicate at least one of protocol type, length, or error correction bits.

Example 22 is the apparatus of Example 1, the logic to transmit data off-package using a variable-length payload packet comprising at least one encoding indicator in a set of initial bits preceding a payload of the variable-length payload packet.

Example 23 is the apparatus of Example 1, the logic to route the data using a physical (PHY) layer of the component comprising a standard interconnect protocol PHY layer having an extended width.

Example 24 is the apparatus of Example 1, the logic to route the data using a physical (PHY) layer of the component comprising a peripheral component interconnect express (PCIe) protocol having an extended width of 26.

Example 25 is the apparatus of Example 1, the component comprising a standard interconnect protocol PHY layer having an extended width, the logic to perform link training to initialize a link layer associated with the standard interconnect protocol PHY layer to at least one standard width.

Example 26 is the apparatus of Example 1, the component comprising a standard interconnect protocol PHY layer having a standard number of lanes, the logic to route the data via the standard interconnect protocol PHY layer by overlaying a basic unit of transfer for the data over the standard number of lanes.

Example 27 is the apparatus of Example 1, the component comprising a standard interconnect protocol PHY layer having a standard number of lanes, the logic to route the data via the standard interconnect protocol PHY layer by transmitting protocol indictor information in a first lane of the standard number of lanes, and encoding packet lengths using remaining lanes of the standard number of lanes, the packet lengths comprising a length common to each of a plurality of protocols supported by the component.

Example 28 is a system to provide multi-interconnect protocol communication, comprising an apparatus according to any of examples 1 to 27, and at least one central processing unit (CPU).

Example 29 is a method for providing multi-interconnect protocol communication, the apparatus comprising determining data to be communicated via a multi-interconnect protocol, providing the data to a multi-protocol multiplexer to determine a route for the data, routing the data on-package on a component responsive to the multi-protocol multiplexer indicating a multi-interconnect on-package mode, and routing the data off-package, via at least one connector of the component operative to connect the component to at least one off-package device via a standard interconnect protocol, responsive to the multi-protocol multiplexer indicating a multi-interconnect off-package mode.

Example 30 is the method of Example 29, the multi-protocol multiplexer comprising a static multiplexer.

Example 31 is the method of Example 29, the multi-protocol multiplexer comprising a static multiplexer having an operating mode configured via setting of a fuse.

Example 32 is the method of Example 29, the multi-protocol multiplexer comprising a static multiplexer having an operating mode configured via instruction provided during boot-up of a system comprising the component.

Example 33 is the method of Example 29, the at least one connector comprising at least one of a pin or a bump.

Example 34 is the method of Example 29, comprising routing the data communicated via the multi-interconnect protocol using a standard interconnect protocol physical (PHY) layer of the component.

Example 35 is the method of Example 29, comprising determining a protocol for transmitting the data based on an indicator element, the protocol comprising one of a standard interconnect protocol or the multi-interconnect protocol.

Example 36 is the method of Example 29, comprising determining a protocol for transmitting the data based on an indicator element comprising a dedicated wire, the protocol comprising one of a standard interconnect protocol or the multi-interconnect protocol.

Example 37 is the method of Example 29, comprising determining a protocol for transmitting the data based on an indicator element comprising a set of bits on a shared wire, the protocol comprising one of a standard interconnect protocol or the multi-interconnect protocol.

Example 38 is the method of Example 29, comprising determining a protocol for transmitting the data based on an encoding transmitted via an indicator element, the protocol comprising one of a standard interconnect protocol or the multi-interconnect protocol.

Example 39 is the method of Example 29, the standard interconnect protocol comprising a serial protocol.

Example 40 is the method of Example 29, the standard interconnect protocol comprising at least one of a serial protocol or a point-to-point protocol.

Example 41 is the method of Example 29, the standard interconnect protocol comprising a peripheral component interconnect express (PCIe) protocol.

Example 42 is the method of Example 29, the multi-interconnect protocol configured to support at least two of a point-to-point protocol, a serial protocol, a memory interconnect protocol, an on-package protocol, an intra-device protocol, or a fabric-based protocol.

Example 43 is the method of Example 29, the multi-interconnect protocol configured to support a memory interconnect protocol, an intra-device protocol, and a serial protocol.

Example 44 is the method of Example 29, the multi-interconnect protocol configured to support an intra-device interconnect (IDI) protocol, a peripheral component interconnect express (PCIe) protocol, and a scalable memory interconnect (SMI) protocol.

Example 45 is the method of Example 29, the standard interconnect protocol comprising at least one of a point-to-point protocol or a peripheral component interconnect express (PCIe) protocol, the multi-interconnect protocol configured to support at least two of a peripheral component interconnect express (PCIe) protocol, a scalable memory interconnect (SMI) protocol, or a fabric-based protocol.

Example 46 is the method of Example 29, comprising interleaving data communicated off-package at fixed-bit intervals.

Example 47 is the method of Example 29, comprising interleaving data off-package at fixed-bit intervals using a specified wire of the at least one connector to indicate a protocol type for the data.

Example 48 is the method of Example 29, comprising transmitting data off-package using a variable-length payload packet.

Example 49 is the method of Example 29, comprising transmitting data off-package using a variable-length payload packet comprising at least one encoding indicator to indicate at least one of protocol type, length, or error correction bits.

Example 50 is the method of Example 29, comprising transmitting data off-package using a variable-length payload packet comprising at least one encoding indicator in a set of initial bits preceding a payload of the variable-length payload packet.

Example 51 is the method of Example 29, comprising routing the data using a physical (PHY) layer of the component comprising a standard interconnect protocol PHY layer having an extended width.

Example 52 is the method of Example 29, comprising routing the data using a physical (PHY) layer of the component comprising a peripheral component interconnect express (PCIe) protocol having an extended width of 26.

Example 53 is the method of Example 29, the component comprising a standard interconnect protocol PHY layer having an extended width, comprising performing link training to initialize a link layer associated with the standard interconnect protocol PHY layer to at least one standard width.

Example 54 is the method of Example 29, the component comprising a standard interconnect protocol PHY layer having a standard number of lanes, comprising routing the data via the standard interconnect protocol PHY layer by overlaying a basic unit of transfer for the data over the standard number of lanes.

Example 55 is the method of Example 29, the component comprising a standard interconnect protocol PHY layer having a standard number of lanes, comprising routing the data via the standard interconnect protocol PHY layer by transmitting protocol indictor information in a first lane of the standard number of lanes, and encoding packet lengths using remaining lanes of the standard number of lanes, the packet lengths comprising a length common to each of a plurality of protocols supported by the component.

Example 56 is a computer-readable storage medium, comprising a plurality of instructions to provide multi-interconnect protocol communication that, when executed, to enable processing circuitry to determine data to be communicated via a multi-interconnect protocol, provide the data to a multi-protocol multiplexer to determine a route for the data, route the data on-package on a component responsive to the multi-protocol multiplexer indicating a multi-interconnect on-package mode, and route the data off-package, via at least one connector of the component operative to connect the component to at least one off-package device via a standard interconnect protocol, responsive to the multi-protocol multiplexer indicating a multi-interconnect off-package mode.

Example 57 is the computer-readable storage medium of Example 56, the multi-protocol multiplexer comprising a static multiplexer.

Example 58 is the computer-readable storage medium of Example 56, the multi-protocol multiplexer comprising a static multiplexer having an operating mode configured via setting of a fuse.

Example 59 is the computer-readable storage medium of Example 56, the multi-protocol multiplexer comprising a static multiplexer having an operating mode configured via instruction provided during boot-up of a system comprising the component.

Example 60 is the computer-readable storage medium of Example 56, the at least one connector comprising at least one of a pin or a bump.

Example 61 is the computer-readable storage medium of Example 56, the instructions, when executed, to enable the processing circuitry to route the data communicated via the multi-interconnect protocol using a standard interconnect protocol physical (PHY) layer of the component.

Example 62 is the computer-readable storage medium of Example 56, the instructions, when executed, to enable the processing circuitry to determine a protocol for transmitting the data based on an indicator element, the protocol comprising one of a standard interconnect protocol or the multi-interconnect protocol.

Example 63 is the computer-readable storage medium of Example 56, the instructions, when executed, to enable the processing circuitry to determine a protocol for transmitting the data based on an indicator element comprising a dedicated wire, the protocol comprising one of a standard interconnect protocol or the multi-interconnect protocol.

Example 64 is the computer-readable storage medium of Example 56, the instructions, when executed, to enable the processing circuitry to determine a protocol for transmitting the data based on an indicator element comprising a set of bits on a shared wire, the protocol comprising one of a standard interconnect protocol or the multi-interconnect protocol.

Example 65 is the computer-readable storage medium of Example 56, the instructions, when executed, to enable the processing circuitry to determine a protocol for transmitting the data based on an encoding transmitted via an indicator element, the protocol comprising one of a standard interconnect protocol or the multi-interconnect protocol.

Example 66 is the computer-readable storage medium of Example 56, the standard interconnect protocol comprising a serial protocol.

Example 67 is the computer-readable storage medium of Example 56, the standard interconnect protocol comprising at least one of a serial protocol or a point-to-point protocol.

Example 68 is the computer-readable storage medium of Example 56, the standard interconnect protocol comprising a peripheral component interconnect express (PCIe) protocol.

Example 69 is the computer-readable storage medium of Example 56, the multi-interconnect protocol configured to support at least two of a point-to-point protocol, a serial protocol, a memory interconnect protocol, an on-package protocol, an intra-device protocol, or a fabric-based protocol.

Example 70 is the computer-readable storage medium of Example 56, the multi-interconnect protocol configured to support a memory interconnect protocol, an intra-device protocol, and a serial protocol.

Example 71 is the computer-readable storage medium of Example 56, the multi-interconnect protocol configured to support an intra-device interconnect (IDI) protocol, a peripheral component interconnect express (PCIe) protocol, and a scalable memory interconnect (SMI) protocol.

Example 72 is the computer-readable storage medium of Example 56, the standard interconnect protocol comprising at least one of a point-to-point protocol or a peripheral component interconnect express (PCIe) protocol, the multi-interconnect protocol configured to support at least two of a peripheral component interconnect express (PCIe) protocol, a scalable memory interconnect (SMI) protocol, or a fabric-based protocol.

Example 73 is the computer-readable storage medium of Example 56, the instructions, when executed, to enable the processing circuitry to interleave data communicated off-package at fixed-bit intervals.

Example 74 is the computer-readable storage medium of Example 56, the instructions, when executed, to enable the processing circuitry to interleave data off-package at fixed-bit intervals using a specified wire of the at least one connector to indicate a protocol type for the data.

Example 75 is the computer-readable storage medium of Example 56, the instructions, when executed, to enable the processing circuitry to transmit data off-package using a variable-length payload packet.

Example 76 is the computer-readable storage medium of Example 56, the instructions, when executed, to enable the processing circuitry to transmit data off-package using a variable-length payload packet comprising at least one encoding indicator to indicate at least one of protocol type, length, or error correction bits.

Example 77 is the computer-readable storage medium of Example 56, the instructions, when executed, to enable the processing circuitry to transmit data off-package using a variable-length payload packet comprising at least one encoding indicator in a set of initial bits preceding a payload of the variable-length payload packet.

Example 78 is the computer-readable storage medium of Example 56, the instructions, when executed, to enable the processing circuitry to route the data using a physical (PHY) layer of the component comprising a standard interconnect protocol PHY layer having an extended width.

Example 79 is the computer-readable storage medium of Example 56, the instructions, when executed, to enable the processing circuitry to route the data using a physical (PHY) layer of the component comprising a peripheral component interconnect express (PCIe) protocol having an extended width of 26.

Example 80 is the computer-readable storage medium of Example 56, the component comprising a standard interconnect protocol PHY layer having an extended width, the instructions, when executed, to enable the processing circuitry to perform link training to initialize a link layer associated with the standard interconnect protocol PHY layer to at least one standard width.

Example 81 is the computer-readable storage medium of Example 56, the component comprising a standard interconnect protocol PHY layer having a standard number of lanes, the instructions, when executed, to enable the processing circuitry to route the data via the standard interconnect protocol PHY layer by overlaying a basic unit of transfer for the data over the standard number of lanes.

Example 82 is the computer-readable storage medium of Example 56, the component comprising a standard interconnect protocol PHY layer having a standard number of lanes, the instructions, when executed, to enable the processing circuitry to route the data via the standard interconnect protocol PHY layer by transmitting protocol indictor information in a first lane of the standard number of lanes, and encoding packet lengths using remaining lanes of the standard number of lanes, the packet lengths comprising a length common to each of a plurality of protocols supported by the component.

Example 83 is an apparatus for providing multi-interconnect protocol communication, the apparatus comprising a data management means to determine data to be communicated via a multi-interconnect protocol, and provide the data to a multi-protocol multiplexer to determine a route for the data, and a data transmission means to route the data on-package responsive to the multi-protocol multiplexer indicating a multi-interconnect on-package mode, and route the data off-package via the at least one connector responsive to the multi-protocol multiplexer indicating a multi-interconnect off-package mode.

Example 84 is the apparatus of Example 83, the multi-protocol multiplexer comprising a static multiplexer.

Example 85 is the apparatus of Example 83, the multi-protocol multiplexer comprising a static multiplexer having an operating mode configured via setting of a fuse.

Example 86 is the apparatus of Example 83, the multi-protocol multiplexer comprising a static multiplexer having an operating mode configured via instruction provided during boot-up of a system comprising the component.

Example 87 is the apparatus of Example 83, the at least one connector comprising at least one of a pin or a bump.

Example 88 is the apparatus of Example 83, the data transmission means to route the data communicated via the multi-interconnect protocol using a standard interconnect protocol physical (PHY) layer of the component.

Example 89 is the apparatus of Example 83, comprising a protocol determination means to determine a protocol for transmitting the data based on an indicator element, the protocol comprising one of a standard interconnect protocol or the multi-interconnect protocol.

Example 90 is the apparatus of Example 83, comprising a protocol determination means to determine a protocol for transmitting the data based on an indicator element comprising a dedicated wire, the protocol comprising one of a standard interconnect protocol or the multi-interconnect protocol.

Example 91 is the apparatus of Example 83, comprising a protocol determination means to determine a protocol for transmitting the data based on an indicator element comprising a set of bits on a shared wire, the protocol comprising one of a standard interconnect protocol or the multi-interconnect protocol.

Example 92 is the apparatus of Example 83, comprising a protocol determination means to determine a protocol for transmitting the data based on an encoding transmitted via an indicator element, the protocol comprising one of a standard interconnect protocol or the multi-interconnect protocol.

Example 93 is the apparatus of Example 83, the standard interconnect protocol comprising a serial protocol.

Example 94 is the apparatus of Example 83, the standard interconnect protocol comprising at least one of a serial protocol or a point-to-point protocol.

Example 95 is the apparatus of Example 83, the standard interconnect protocol comprising a peripheral component interconnect express (PCIe) protocol.

Example 96 is the apparatus of Example 83, the multi-interconnect protocol configured to support at least two of a point-to-point protocol, a serial protocol, a memory interconnect protocol, an on-package protocol, an intra-device protocol, or a fabric-based protocol.

Example 97 is the apparatus of Example 83, the multi-interconnect protocol configured to support a memory interconnect protocol, an intra-device protocol, and a serial protocol.

Example 98 is the apparatus of Example 83, the multi-interconnect protocol configured to support an intra-device interconnect (IDI) protocol, a peripheral component interconnect express (PCIe) protocol, and a scalable memory interconnect (SMI) protocol.

Example 99 is the apparatus of Example 83, the standard interconnect protocol comprising at least one of a point-to-point protocol or a peripheral component interconnect express (PCIe) protocol, the multi-interconnect protocol configured to support at least two of a peripheral component interconnect express (PCIe) protocol, a scalable memory interconnect (SMI) protocol, or a fabric-based protocol.

Example 100 is the apparatus of Example 83, the data transmission means to interleave data communicated off-package at fixed-bit intervals.

Example 101 is the apparatus of Example 83, the data transmission means to interleave data off-package at fixed-bit intervals using a specified wire of the at least one connector to indicate a protocol type for the data.

Example 102 is the apparatus of Example 83, the data transmission means to transmit data off-package using a variable-length payload packet.

Example 103 is the apparatus of Example 83, the data transmission means to transmit data off-package using a variable-length payload packet comprising at least one encoding indicator to indicate at least one of protocol type, length, or error correction bits.

Example 104 is the apparatus of Example 83, the data transmission means to transmit data off-package using a variable-length payload packet comprising at least one encoding indicator in a set of initial bits preceding a payload of the variable-length payload packet.

Example 105 is the apparatus of Example 83, the data transmission means to route the data using a physical (PHY) layer of the component comprising a standard interconnect protocol PHY layer having an extended width.

Example 106 is the apparatus of Example 83, the data transmission means to route the data using a physical (PHY) layer of the component comprising a peripheral component interconnect express (PCIe) protocol having an extended width of 26.

Example 107 is the apparatus of Example 83, the component comprising a standard interconnect protocol PHY layer having an extended width, comprising a link training means to perform link training to initialize a link layer associated with the standard interconnect protocol PHY layer to at least one standard width.

Example 108 is the apparatus of Example 83, the component comprising a standard interconnect protocol PHY layer having a standard number of lanes, the data transmission means to route the data via the standard interconnect protocol PHY layer by overlaying a basic unit of transfer for the data over the standard number of lanes.

Example 109 is the apparatus of Example 83, the component comprising a standard interconnect protocol PHY layer having a standard number of lanes, the data transmission means to route the data via the standard interconnect protocol PHY layer by transmitting protocol indictor information in a first lane of the standard number of lanes, and encoding packet lengths using remaining lanes of the standard number of lanes, the packet lengths comprising a length common to each of a plurality of protocols supported by the component.

Example 110 is a system to provide multi-interconnect protocol communication, comprising an apparatus according to any of examples 83 to 109, and at least one central processing unit (CPU).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. Also, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are at this moment incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture? It is, of course, not possible to describe every conceivable combination of components and methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. An apparatus for providing multi-interconnect protocol communication, the apparatus comprising:
a component comprising at least one connector operative to connect the component to at least one off-package device via a standard interconnect protocol, and
logic, at least a portion of the logic comprised in hardware, the logic to:
determine data to be communicated via a multi-interconnect protocol,
provide the data to a multi-protocol multiplexer to determine a route for the data, the multi-protocol multiplexer set to operate based on fuse logic,
route the data on-package between two or more chips on a substrate used to form the component responsive to the multi-protocol multiplexer indicating a multi-interconnect on-package mode, and
route the data off-package from at least one of the chips to another device off the substrate via the at least one connector responsive to the multi-protocol multiplexer indicating a multi-interconnect off-package mode.

2. The apparatus of claim 1, the multi-protocol multiplexer comprising a static multiplexer.

3. The apparatus of claim 1, the at least one connector comprising at least one of a pin or a bump.

4. The apparatus of claim 1, the logic to route the data communicated via the multi-interconnect protocol using a standard interconnect protocol physical (PHY) layer of the component.

5. The apparatus of any of claims 1 to 4, the logic to determine a protocol for transmitting the data based on an indicator element, the protocol comprising one of a standard interconnect protocol or the multi-interconnect protocol.

6. The apparatus of any of claims 1 to 4, the standard interconnect protocol comprising at least one of a serial protocol or a point-to-point protocol.

7. The apparatus of any of claims 1 to 4, the standard interconnect protocol comprising a peripheral component interconnect express (PCIe) protocol.

8. The apparatus of any of claims 1 to 4, the multi-interconnect protocol configured to support at least two of a point-to-point protocol, a serial protocol, a memory interconnect protocol, an on-package protocol, an intra-device protocol, or a fabric-based protocol.

9. The apparatus of any of claims 1 to 4, the logic to interleave data communicated off-package at fixed-bit intervals.

10. The apparatus of any of claims 1 to 4, the logic to transmit data off-package using a variable-length payload packet.

11. A method for providing multi-interconnect protocol communication, the apparatus comprising:
determining data to be communicated via a multi-interconnect protocol;
providing the data to a multi-protocol multiplexer to determine a route for the data, the multi-protocol multiplexer set to operate based on fuse logic;
routing the data on-package between two or more chips on a substrate on a component responsive to the multi-protocol multiplexer indicating a multi-interconnect on-package mode; and
routing the data off-package from at least one of the chips to another device off the substrate, via at least one connector of the component operative to connect the component to at least one off-package device via a standard interconnect protocol, responsive to the multi-protocol multiplexer indicating a multi-interconnect off-package mode.

12. The method of claim 11, the multi-protocol multiplexer comprising a static multiplexer.

13. The method of claim 11, the at least one connector comprising at least one of a pin or a bump.

14. The method of claim 11, comprising routing the data communicated via the multi-interconnect protocol using a standard interconnect protocol physical (PHY) layer of the component.

15. The method of any of claims 11 to 14, comprising determining a protocol for transmitting the data based on an indicator element, the protocol comprising one of a standard interconnect protocol or the multi-interconnect protocol.

16. The method of any of claims 1 to 4, the standard interconnect protocol comprising at least one of a serial protocol or a point-to-point protocol.

17. The method of any of claims 1 to 4, the standard interconnect protocol comprising a peripheral component interconnect express (PCIe) protocol.

18. The method of any of claims 1 to 4, the multi-interconnect protocol configured to support at least two of a point-to-point protocol, a serial protocol, a memory interconnect protocol, an on-package protocol, an intra-device protocol, or a fabric-based protocol.

19. The method of any of claims 1 to 4, comprising interleaving data communicated off-package at fixed-bit intervals.

20. The method of any of claims 1 to 4, comprising transmitting data off-package using a variable-length payload packet.

21. A non-transitory computer-readable storage medium, comprising a plurality of instructions to provide multi-interconnect protocol communication that, when executed, to enable processing circuitry to:
determine data to be communicated via a multi-interconnect protocol;
provide the data to a multi-protocol multiplexer to determine a route for the data, the multi-protocol multiplexer set to operate based on fuse logic;
route the data on-package between two or more chips on a substrate on a component responsive to the multi-protocol multiplexer indicating a multi-interconnect on-package mode; and
route the data off-package from at least one of the chips to another device off the substrate, via at least one connector of the component operative to connect the component to at least one off-package device via a standard interconnect protocol, responsive to the multi-protocol multiplexer indicating a multi-interconnect off-package mode.

22. The computer-readable storage medium of claim 21, the multi-protocol multiplexer comprising a static multiplexer.

23. The computer-readable storage medium of claim 21, the instructions, when executed, to enable the processing circuitry to route the data communicated via the multi-interconnect protocol using a standard interconnect protocol physical (PHY) layer of the component.

24. The computer-readable storage medium of any of claims 21 to 23, the instructions, when executed, to enable the processing circuitry to determine a protocol for transmitting the data based on an indicator element, the protocol comprising one of a standard interconnect protocol or the multi-interconnect protocol.

25. The computer-readable storage medium of any of claims 21 to 23, the instructions, when executed, to enable the processing circuitry to route the data using a physical (PHY) layer of the component comprising a standard interconnect protocol PHY layer having an extended width relative to a standard width.

\* \* \* \* \*